(12) United States Patent  
Sánchez De La Fuente et al.

(10) Patent No.: US 12,395,651 B2
(45) Date of Patent: Aug. 19, 2025

(54) SUBPICTURE-RELATED VIDEO CODING CONCEPTS

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 279 days.

(21) Appl. No.: 17/926,646

(22) PCT Filed: May 20, 2021

(86) PCT No.: PCT/EP2021/063553
§ 371 (c)(1),
(2) Date: Nov. 21, 2022

(87) PCT Pub. No.: WO2021/234125
PCT Pub. Date: Nov. 25, 2021

(65) Prior Publication Data
US 2023/0199202 A1    Jun. 22, 2023

(30) Foreign Application Priority Data
May 22, 2020   (EP) .................. 20176208

(51) Int. Cl.
*H04N 19/31*   (2014.01)
*H04N 19/109*  (2014.01)
(Continued)

(52) U.S. Cl.
CPC .......... *H04N 19/31* (2014.11); *H04N 19/109* (2014.11); *H04N 19/119* (2014.11);
(Continued)

(58) Field of Classification Search
CPC .... H04N 19/31; H04N 19/109; H04N 19/119; H04N 19/139; H04N 19/172; H04N 19/463; H04N 19/52
(Continued)

(56) References Cited

U.S. PATENT DOCUMENTS 10,334,260 B2 *  6/2019  Hannuksela ............ G06F 9/328
2020/0366911 A1 * 11/2020  Choi ...................... H04N 19/50
(Continued)

FOREIGN PATENT DOCUMENTS

| JP | 2020-10341 | 1/2020 |
| WO | 2006/108917 | 10/2006 |
| WO | 2020/084464 | 4/2020 |

OTHER PUBLICATIONS

Choi et al. ("AHG9/AHG12: On signaling of subpicture partitioning in SPS," JVET Apr. 15-24, 2020) (Year: 2020).*
(Continued)

*Primary Examiner* — Matthew David Kim
(74) *Attorney, Agent, or Firm* — NIXON & VANDERHYE P.C.

(57) ABSTRACT

Video coding concepts are described which relate to encoding, decoding, extracting and mixing video data streams having encoded therein pictures in a manner subdivided into independently coded subpictures. The concepts relate to an extraction of subpicture specific video data streams having
(Continued)

Figure 1:
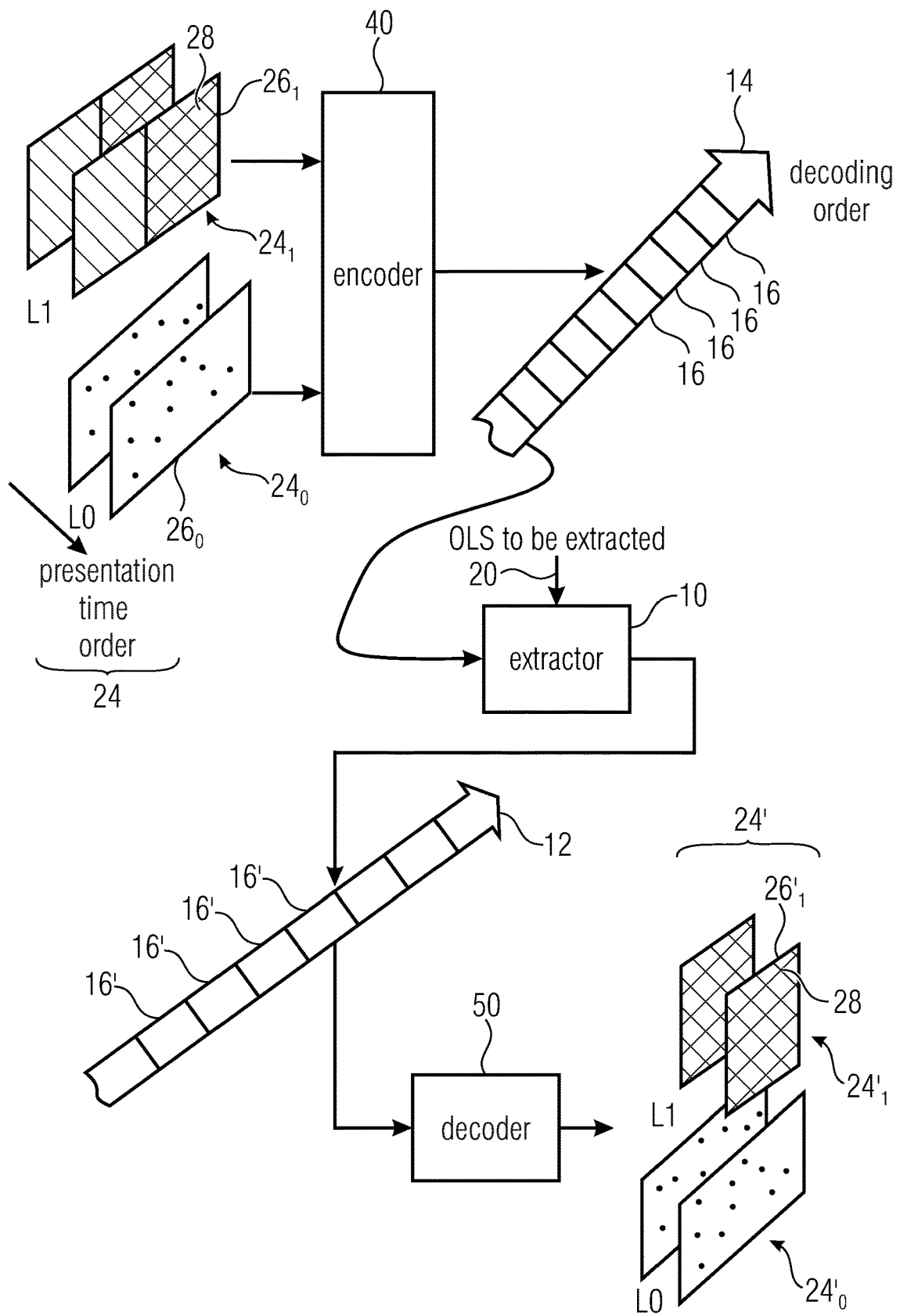

a layer of subdivided pictures and a layer of un-subdivided pictures, a handling of inter-layer prediction tools and a handling of scaling windows for inter-layer prediction for such video data streams, a determination of decoder capability requirements for such data streams, layer-specific constraints for such data streams, and mixing of subpictures encoded with different types of independent coding.

26 Claims, 13 Drawing Sheets

(51) Int. Cl.
 *H04N 19/119* (2014.01)
 *H04N 19/139* (2014.01)
 *H04N 19/172* (2014.01)
 *H04N 19/463* (2014.01)
 *H04N 19/52* (2014.01)

(52) U.S. Cl.
 CPC ......... *H04N 19/139* (2014.11); *H04N 19/172* (2014.11); *H04N 19/463* (2014.11); *H04N 19/52* (2014.11)

(58) Field of Classification Search
 USPC .................................................. 375/240.16
 See application file for complete search history.

(56) References Cited

U.S. PATENT DOCUMENTS

| | | | | |
|---|---|---|---|---|
| 2021/0092449 A1* | 3/2021 | Chang | ................... | H04N 19/17 |
| 2021/0297704 A1* | 9/2021 | Chang | ................... | H04N 19/82 |
| 2021/0360289 A1* | 11/2021 | He | ....................... | H04N 19/119 |
| 2022/0132143 A1* | 4/2022 | Choi | ..................... | H04N 19/177 |
| 2022/0394304 A1* | 12/2022 | Deng | ................... | H04N 19/132 |
| 2023/0082583 A1* | 3/2023 | Wang | ................... | H04N 19/184 |
| | | | | 375/240.02 |

OTHER PUBLICATIONS

Skupin et al. ("AHG12: On subpicture conformance," JVET Apr. 15-24, 2020) (Year: 2020).*
Skupin ("AHG12: A summary of proposals on subpicture extraction," JVET Jan. 7-17, 2020) (Year: 2020).*
Skupin et al. ("AHG9/12: On subpicture conformance," JVET Jun. 22-Jul. 1, 2020) (Year: 2020).*
Benjamin Bross, et al., "Versatile Video Coding (Draft 9)", 130. MPEG Meeting; Apr. 20, 2020-Apr. 24, 2020; Alpbach; (Motion Picture Expert Group or ISO/IEC JTC1/SC29/WG11), No. JVET-R2001-vA; m53983; JVET-R2001, May 15, 2020, 524 pages.
Byeongdoo Choi, et al., "AHG9/AHG12: On signaling of subpicture and slice in SPS", 130. MPEG Meeting; Apr. 20, 2020-Apr. 24, 2020; Alpbach; (Motion Picture Expert Group or ISO/IEC JTC1/SC29/WG11), No. m53085; JVET-R0118, Apr. 17, 2020, 2 pages.
Robert Skupin, et al., "AHG12: On subpicture conformance", 130. MPEG Meeting; Apr. 20, 2020-Apr. 24, 2020; Alpbach; (Motion Picture Expert Group or ISO/IEC JTC1/SC29/WG11), No. m53273; JVET-R0295, Apr. 4, 2020, 6 pages.
Robert Skupin, et al., "AHG12: A summary of proposals on subpicture extraction", 17. JVET Meeting; Jan. 7, 2020-Jan. 17, 2020; Brussels; (The Joint Video Exploration Team of ISO/IEC JTC1/SC29/WG11 and ITU-T SG.16)., No. JVET-Q0694; m52657, Jan. 8, 2020, 4 pages.
Robert Skupin, et al., "AHG9/12: On subpicture conformance", 131. MPEG Meeting; Jun. 29, 2020-Jul. 3, 2020; Online; (Motion Picture Expert Group or I50/IEC JTC1/5C29/WG11), No. m54084; JVET-S0098, May 22, 2020, 7 pages.
International Search Report for PCT/EP2021/063553 dated Sep. 16, 2021, 7 pages.
Written Opinion of the ISA for PCT/EP2021/063553 dated Sep. 16, 2021, 10 pages.
Wang et al., "AHG8/AHG9/AHG12: On the combination of RPR, subpictures, and scalability" JVET-R0058-v1, 18th Meeting: by teleconference, Apr. 15-24, 2020, 9 pages.
Wan et al., "AHG8: RPR Scaling Window Issues" JVET-Q0487-v2, 17th Meeting: Brussels, BE, Jan. 7-17, 2020, 6 pages.
Lee et al., "AHG6: Wrap-around motion vector prediction at the picture boundary" Document: JVET-P0669-v3, Joint Video Experts Team (JVET) of ITU-T SG 16 WP 3 and ISO/IEC JTC 1/SC 29/WG 11, 16th Meeting, Geneva, CH, Oct. 1-11, 2019, 6 pages.

* cited by examiner

SUBPICTURE-RELATED VIDEO CODING CONCEPTS

This application is the U.S. national phase of International Application No. PCT/EP2021/063553 filed May 20, 2021 which designated the U.S. and claims priority to EP patent Application No. 20176208.5 filed May 22, 2020, the entire contents of each of which are hereby incorporated by reference.

Embodiments of the present disclosure relate to encoders for encoding video content into a video data stream. Further embodiments relate to apparatuses for extracting a subpicture-specific video data stream from a multi-layered video data stream. Further embodiments relate to decoders for decoding a video data stream. Further embodiments relate to methods for encoding video content into a video data stream, methods for decoding a video data stream, and methods for extracting a subpicture-specific video data stream from a multi-layered video data stream. Further embodiments relate to video data streams.

In video coding, a picture of a video sequence may be coded into a video data stream by means of multiple subpictures, each of which comprises a portion of the picture. In other words, the video data stream may comprise multiple subpictures associated with an equal presentation time. By selecting one or multiple of the subpictures for decoding or presentation, the presented video content may such be selected on decoder side. For example, such video data streams may be utilized in viewport dependent streaming scenarios. As in cases in which one or more of the subpictures, but not the entire picture, is to be presented, it may be favorable not to decode the entire video data stream, but only a portion thereof. That way, a better rate-distortion relation of the presented video content may be achieved at a given decoding cost. To this end, a portion of the video data stream may be extracted before decoding.

Therefore, it is desirable to have a concept for encoding and handling video data streams comprising multiple subpictures in a manner that provides a good tradeoff between a precise extraction of a subpicture specific video data stream and a low signaling overhead.

Embodiments according to a first aspect of the invention rely on the idea to distinguish, in the extraction or definition or description of subpicture specific video data stream of a multi-layered video data stream, between layers having encoded thereinto a video in a non-subpicture divided manner and layers having encoded thereinto a video in a manner subdivided into two or more subpictures. Distinguishing between layers encoded in a non-subpicture divided manner and layers encoded in a subpicture divided manner allows to extract or describe subpicture specific video data streams comprising pictures extending beyond the subpicture represented by the subpicture specific video data stream. Therefore, embodiments allow, for example, for an extraction or description of subpicture specific video data stream, in which subpictures of a layer encoded in a subpicture subdivided manner depend on pictures of a layer encoded in a non-subpicture subdivided manner. Further, in applications such as viewport dependent streaming, having available in the subpicture specific video data stream pictures encoded in a non-subdivided manner may allow that in case of a change of the viewport at least a picture of the quality of the pictures encoded in the non-subdivided manner is immediately available.

Embodiments according to the first aspect of the invention provide an apparatus for extracting a subpicture specific video data stream from a multi-layered video data stream. The multi-layered video data stream, which comprises multiple layers, is composed of (or comprises) bitstream portions, such as NAL units, each of which belong to one of the layers. It is noted, that "composed of" shall—wherever occurring herein—not be understood as being requiring the subject to comprise the object of the composition exclusively; rather, the data stream may comprise, besides the bitstream portions, also other portions as described herein, with the arrangement of the bitstream portions in the data stream adhering to certain rules such as collection of bitstream portions belonging to a certain time stamp within one access unit. According to the first aspect, extracting a subpicture specific video data stream out of the multi-layered video data stream, e.g. by means of an apparatus for extracting a subpicture specific video data stream, comprises checking, for each layer of a layer set, e.g. an output layer set, whether the respective layer has encoded thereinto a video in a manner so that pictures of the video are subdivided into two or more subpictures which are encoded into the respective layer in a manner mutually independent, so that, for each picture of the video, the subpictures of the respective picture are encoded into mutually different bitstream portions of the respective layer, or whether the respective layer has encoded thereinto the video in a non-subpicture-subdivided manner. If the respective layer has encoded thereinto the video in a non-subpicture-subdivided manner, the extracting comprises taking over from the multi-layered video data stream into the subpicture specific video data stream the bitstream portions which belongs to the respective layer so that the subpicture specific video data stream has the video of the respective layer encoded thereinto completely. If the respective layer has encoded thereinto the video in a manner so that pictures of the video are subdivided into two or more subpictures, extracting the sublayer specific video data stream comprises, for each bitstream portion which belongs to the respective layer, reading from the bitstream portion an information revealing which subpicture of the two or more subpictures, the respective bitstream portion has encoded thereinto, and taking over from the multi-layered video data stream into the subpicture specific video data stream the respective bitstream portion of the respective layer, if the respective bitstream portion has encoded thereinto a subpicture which belongs to a predetermined set of one or more subpictures.

Further embodiments are provided by the multi-layered video data stream, and an encoder for encoding same, the multi-layered video data stream comprising decoder capability requirement information on the subpicture specific video data stream extractable from the multi-layered video data stream as performed by the described apparatus for extracting the subpicture specific video data stream. Signaling the decoder capability requirement information in the video data stream allows for a more efficient exploitation of decoder capabilities and/or a selection of a best possible video data stream for decoding in view of the capabilities of the decoder to be used for decoding.

According to embodiments of a second aspect of the invention a multi-layered video data stream comprises a first layer whose bitstream portions have a first video encoded thereinto in a manner so that pictures of the first video are subdivided into two or more subpictures which are encoded into the bitstream portions of the first layer in a manner mutually independently so that, for each picture of the first video, the subpictures of the respective picture of the first video are encoded into mutually different bitstream portions of the first layer. The multi-layered video data stream further comprises a second layer whose bitstream portions have a second video. The first layer's bitstream portions have the first video encoded thereinto using a vector-based prediction from reference pictures. Further, the first layer's bitstream portions have the first video encoded thereinto in a manner including pictures of the second video as the reference pictures, and in an manner where vectors using which the first layer's bitstream portions are encoded and which are comprised by the first layers bitstream portions are, for use in the vector based prediction, to be scaled and offset according to sizes and positions of the scaling windows in the multi-layered video data stream for the pictures of the first video and the reference pictures, respectively. The concept according to the second aspect comprises, in extracting a subpicture specific video data stream out of a multi-layered video data stream, taking over from the multi-layered video data stream into the subpicture specific video data stream the bitstream portions that belong to the second layer so that the subpicture specific video data stream has the video of the respective layer encoded thereinto completely. The extracting of the subpicture specific video data stream further comprises taking over from the multi-layered video data stream into the subpicture specific video data stream each bitstream that belongs to the first layer, and which has encoded thereinto a subpicture which belongs to a predetermined set of one or more subpictures. Further, the extracting of the subpicture specific video data stream comprises adapting a scaling window signalization for the first and/or second layers in the subpicture specific video data stream so that a spatial area of the scaling window of the pictures of the second video spatially corresponds to a spatial area of the scaling window for the predetermined set of one or more subpictures.

Embodiments according to the second aspect may ensure that after extraction of the subpicture specific video data stream, during which the size of the pictures of the first layer may change due to subpicture extraction, scaling of the vectors for the vector based prediction using the scaling windows is performed such that the vectors are scaled to positions and sizes in accordance with positions and sizes as intended by the scaling windows provided in the multi-layered video data stream. Thus, embodiments of the second aspect allow for a combination of the usage of vector based inter-layer prediction with subpicture extraction also in cases, in which a relative picture size between a picture and its inter-layer reference picture change due to subpicture extraction, e.g. cases in which pictures of the reference layer are completely forwarded into the subpicture specific video data stream (e.g. as described with respect to the first aspect).

Embodiments according to a third aspect of the invention, in the encoding and/or decoding of a multi-layered video data stream inter-layer prediction tools are used for coding from/into a first layer of the multi-layered video data stream a first version of a video, the inter-layer prediction tools being used for prediction from a second layer of the multi-layered video data stream, wherein the first version is encoded and the first layer using a first configuration setting for a subpicture-wise independent coding of the first version of the video. Further, a second configuration setting for subpicture-wise independent coding is used for coding a second version of the video from/into the second layer of the multi-layered video data stream. In dependence on whether the first and second configuration settings have a predetermined relationship, a predetermined subset of one or more inter-layer prediction tools is deactivated in the inter-layer prediction from the second layer.

Accordingly, embodiments according to the third aspect allow to precisely control the usage of inter-layer prediction tools so that inter-layer prediction may also be used in cases in which pictures of a multi-layered bitstream are subdivided into subpicture, in particular, in scenarios, in which pictures of different layers of the multi-layered video data stream are subdivided into a different number of subpictures, e.g., in cases in which pictures of one layer are subdivided into subpictures whereas pictures of another layer are not subdivided into subpictures.

Embodiments according to a fourth aspect of the invention provide for an encoding or a handling of a multi-layered video bitstream having encoded thereinto pictures in a manner subdivided into independently coded subpictures in one or more first layers, and having encoded thereinto pictures in a manner unsubdivided in one or more second layers. The multi-layered video bitstream has encoded thereinto several reference decoder capability requirements sufficient for decoding a layer set, each of which includes at least one of the first layers and at least one of the second layers. For each of the reference decoder capability requirements, the multi-layered video data stream comprises information on a first fraction of the respective reference decoder capability requirement attributed to the at least one first layer, and a second fraction of the respective reference decoder capability requirement attributed to the at least one second layer.

Having information on the first fraction and on the second fraction allows for a precise determination of the decoder capability requirement associated with each of several video data streams, which may be extracted from the multi-layered video data stream, such as a subpicture specific video data stream.

Embodiments according to a fifth aspect of the invention provide for a selective application of constraints associated with a reference decoder capability requirement, e.g. layer-specific constraints, to those layers of a layer set indicated in a multi-layered video data stream, which layers have encoded thereinto video pictures in a manner subdivided into independently coded subpictures. During extraction of a subpicture specific video data stream, when the constraints may tighten due to a decrease in picture size, omitting an application of the constraints to a layer, the picture size of which is kept, e.g. a layer the pictures of which are not sub-divided, may avoid to impose disproportionally tight constraints on non-subdivided layers.

Embodiments according to a sixth aspect of the invention provide for an indication in a video data stream, which indication indicates whether pictures encoded into the video data stream are encoded by way of one or more independently coded subpictures, the indication discriminating between different types of coding independency between the one or more independently coded subpictures and a surrounding of the one or more independent decoded subpictures. Embodiments according to the sixth aspect allow for a mixing of bitstream portions, such as NAL units of different types into one picture, i.e., one access unit, of a composed bitstream. Thus, embodiments according to the sixth aspect allow for a higher flexibility in the mixing of video bitstreams.

Figure 2:
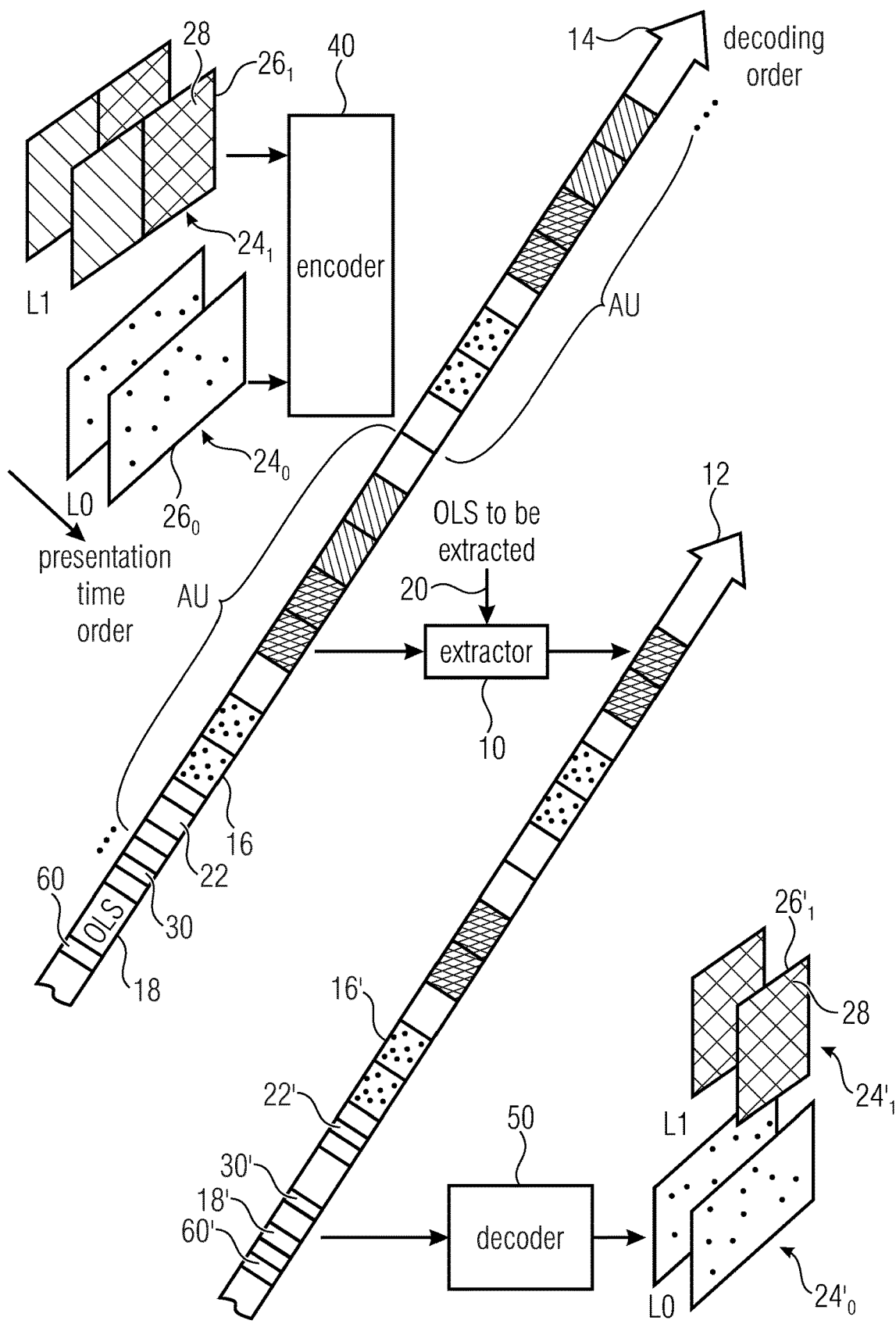
Figure 3:
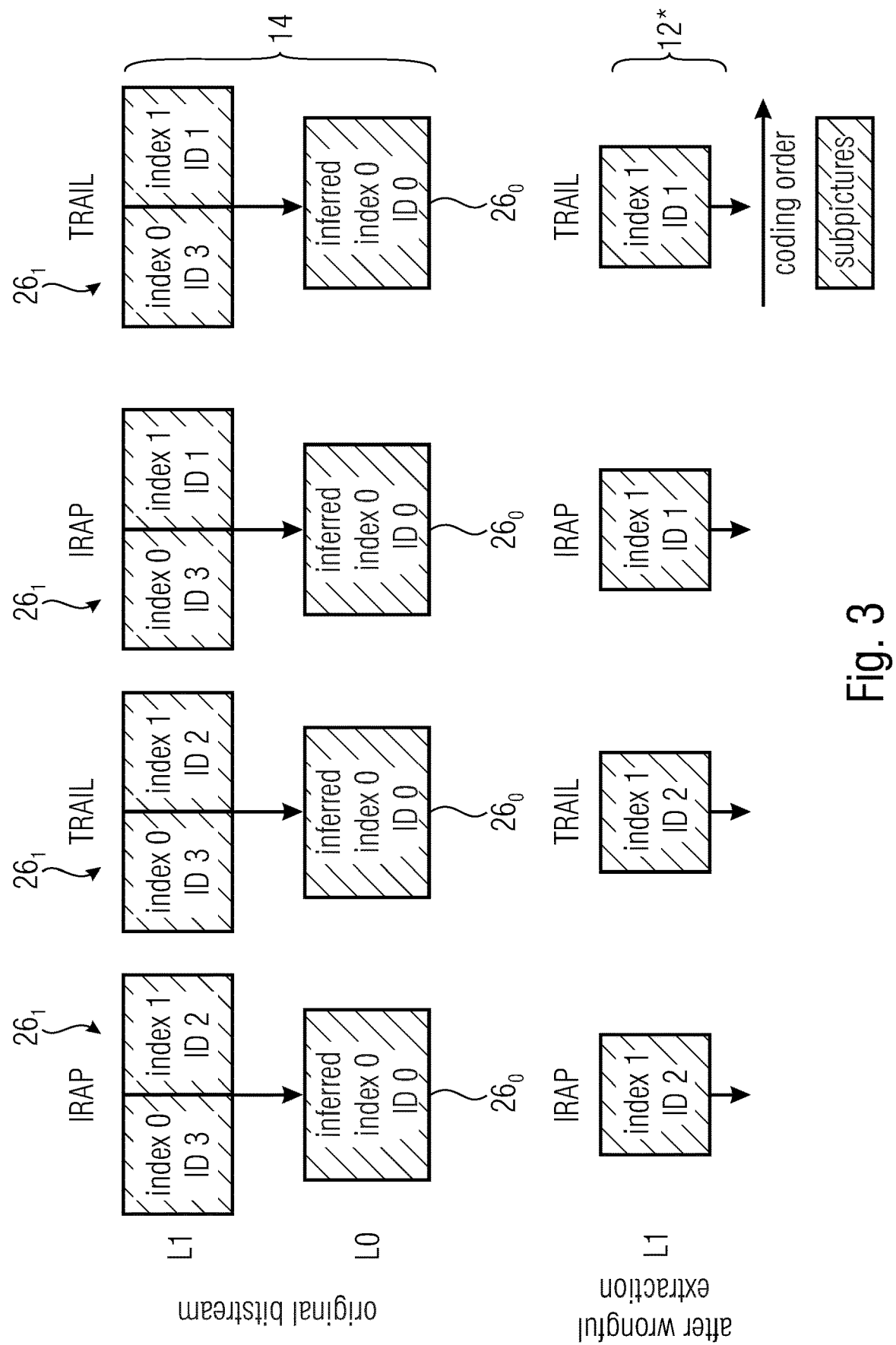
Figure 4:
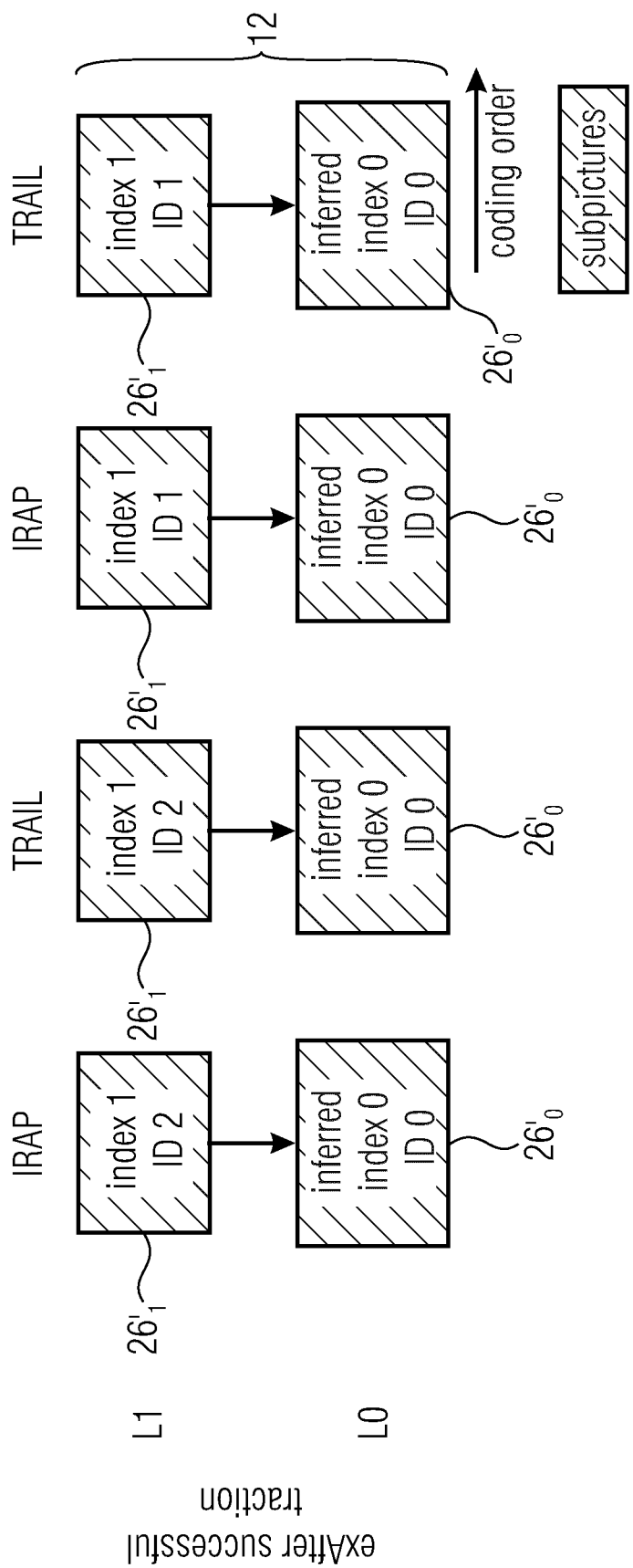
Figure 5:
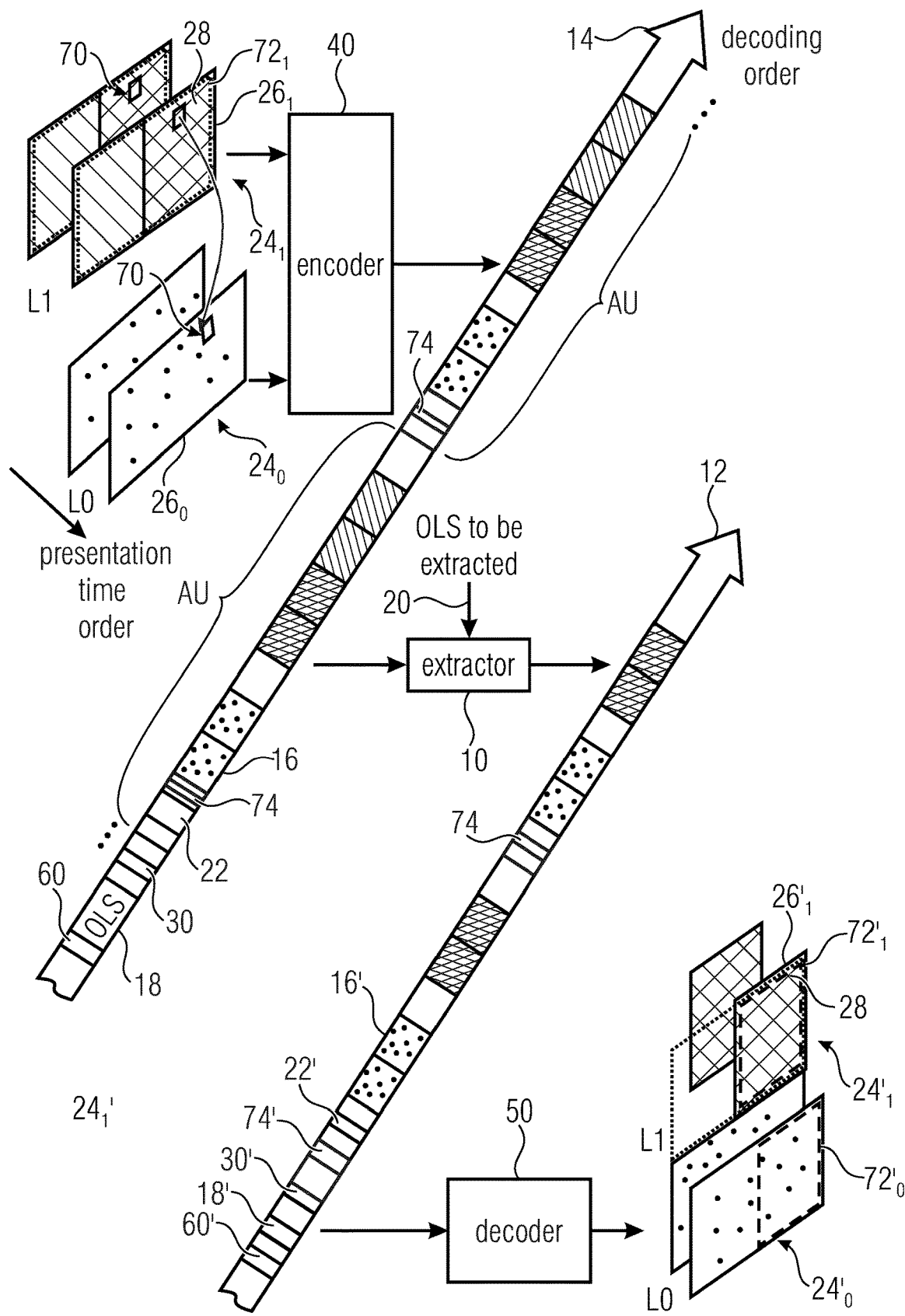
Figure 6:
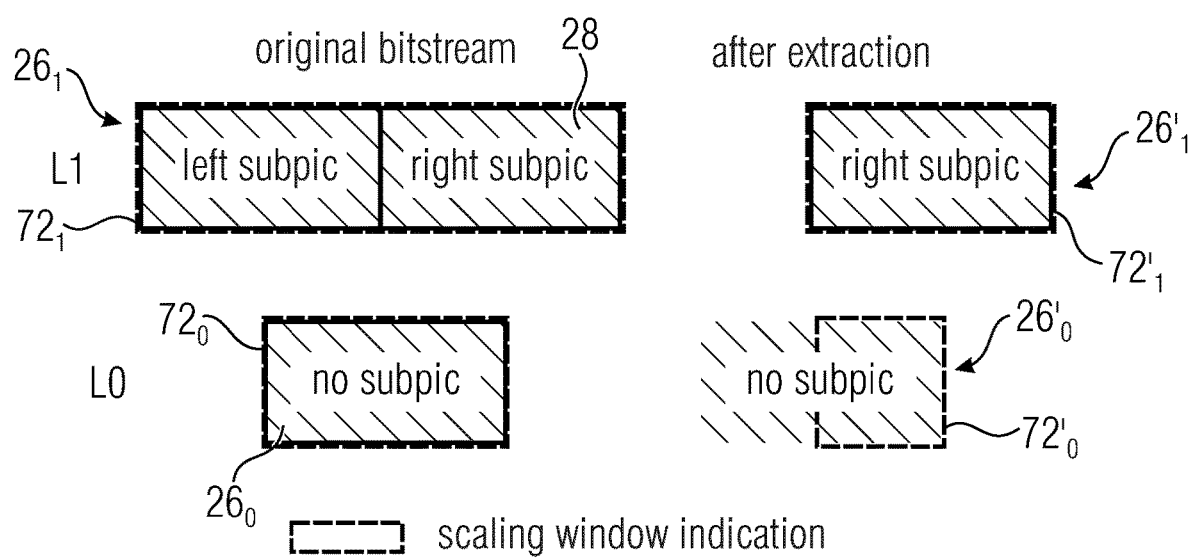
Figure 7:
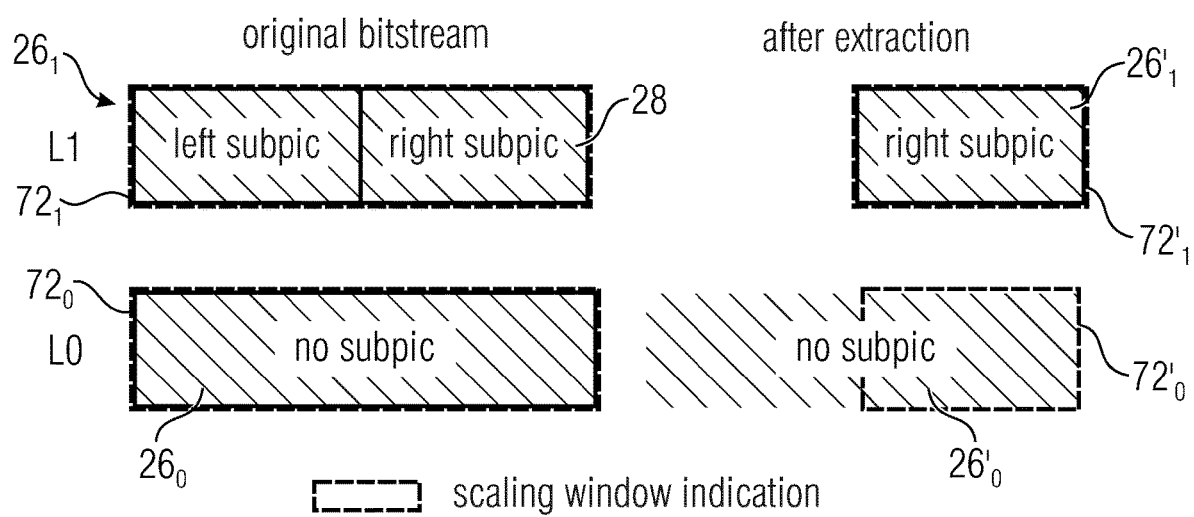
Figure 8:
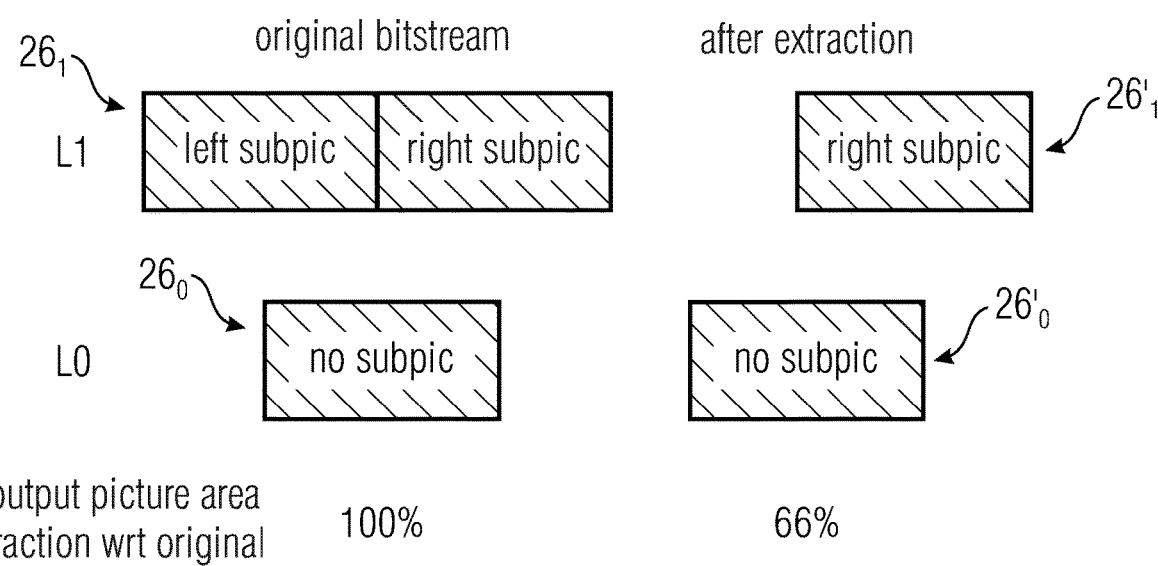
Figure 9:
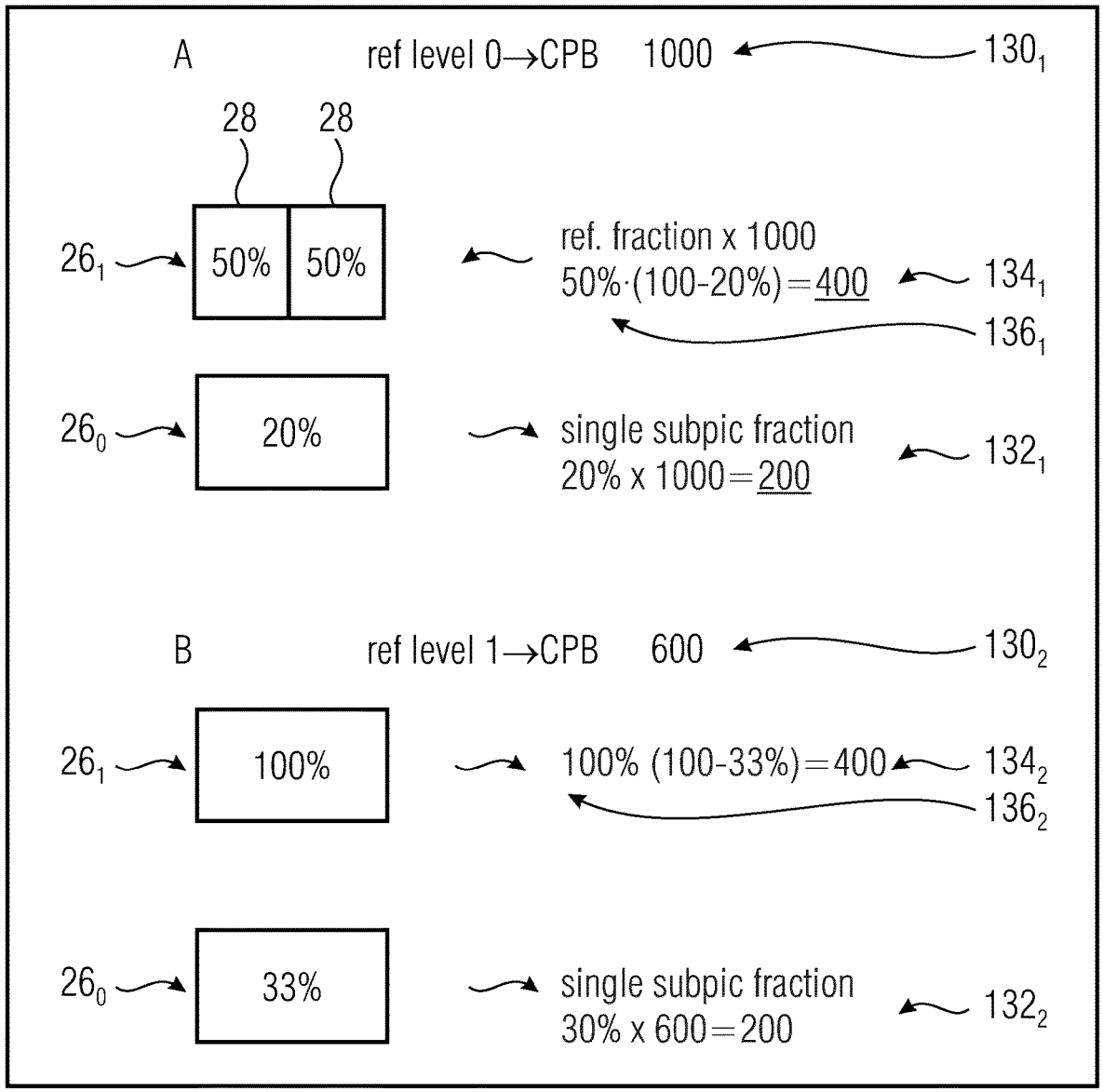
Figure 10:
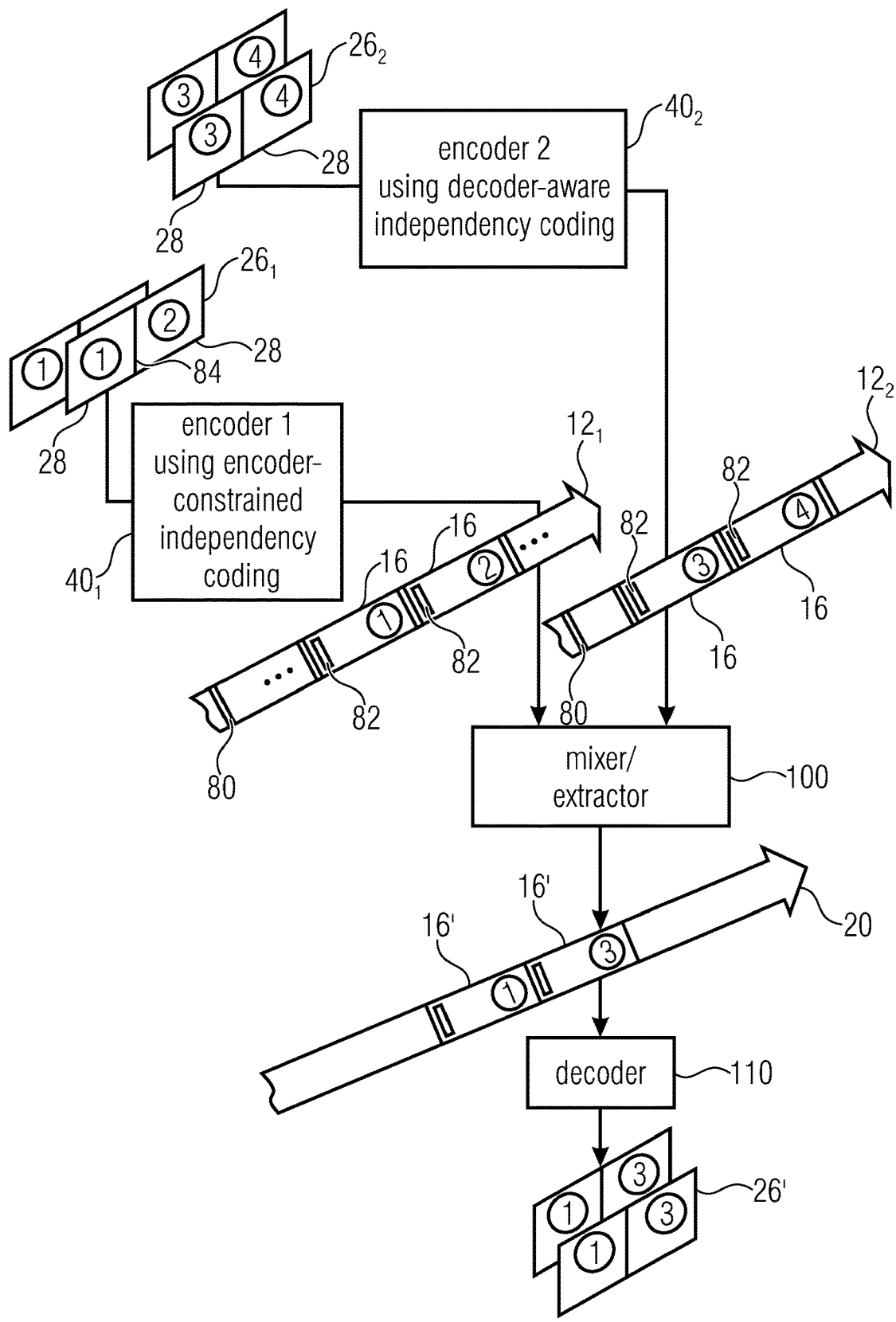
Figure 11:
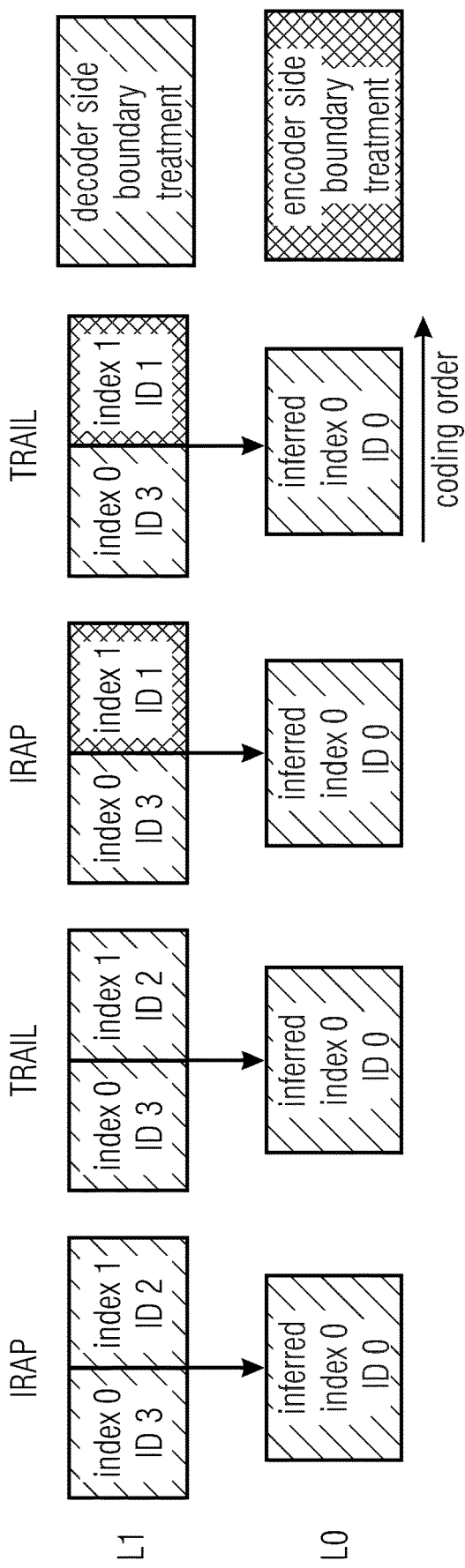
Figure 12:
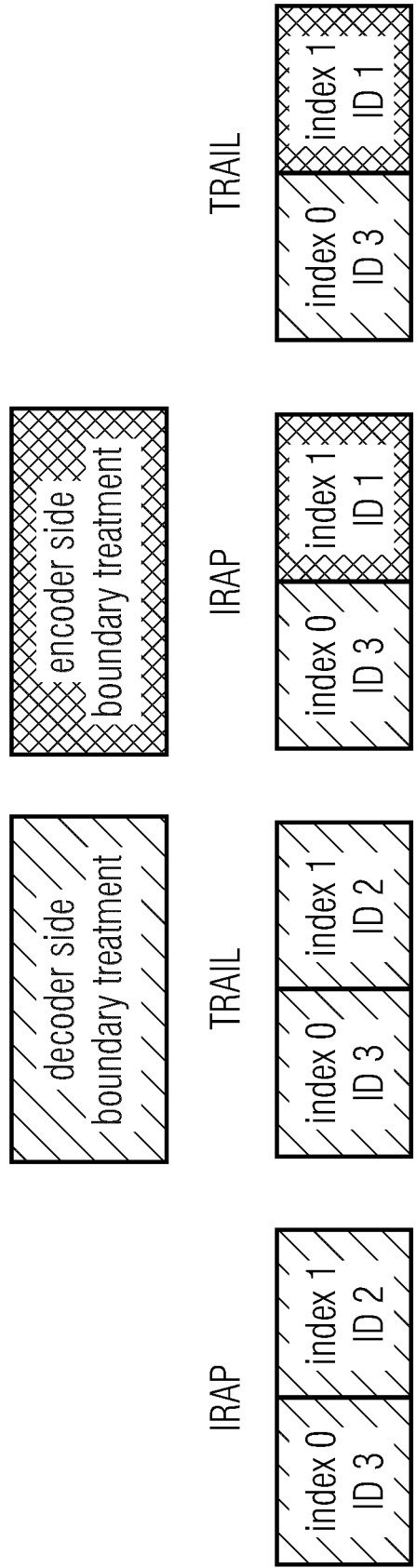
Figure 13:
Figure 13:
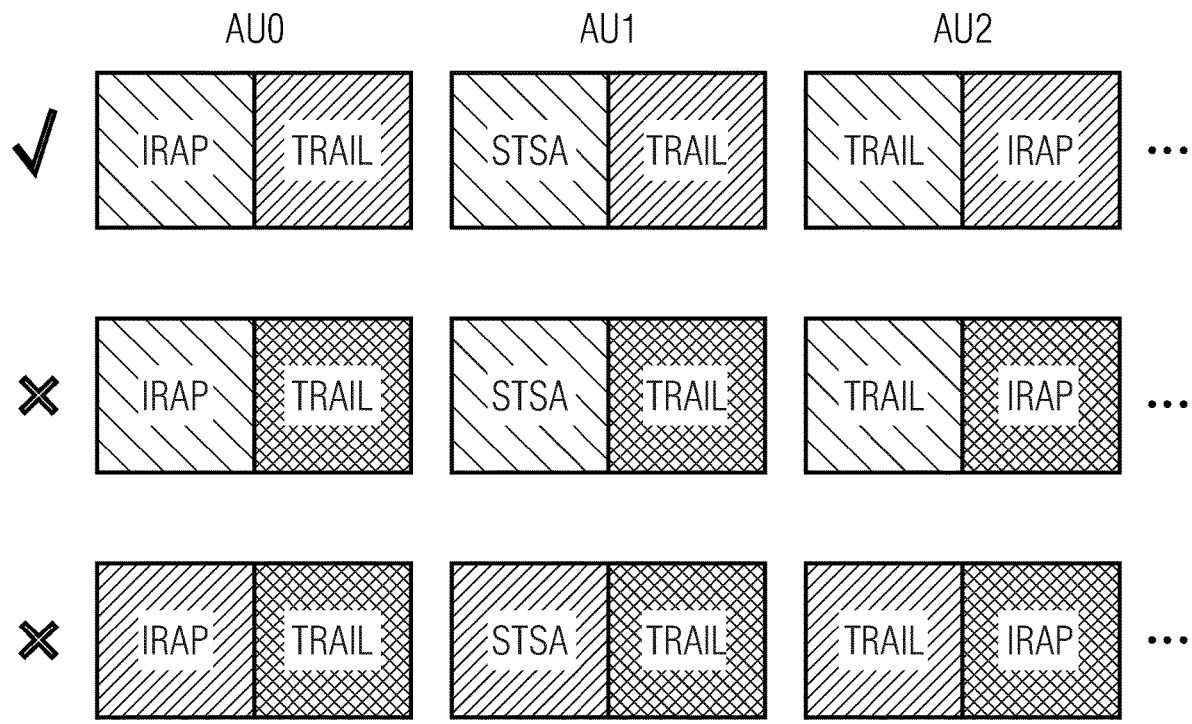

Embodiments and advantageous implementations of the present disclosure are described in more detail below with respect to the figures, among which:

FIG. 1 illustrates examples of an encoder, an extractor and a decoder according to an embodiment, FIG. 2 illustrates examples of an encoder, a video data stream, and an extractor according to an embodiment, FIG. 3 illustrates an example of a video data stream and an example of an erroneous extraction of a subpicture specific video data stream, FIG. 4 illustrates an example of a subpicture specific video data stream, FIG. 5 illustrates examples of an encoder, an extractor, and a multi-layered video data stream according to the second aspect of the invention, FIG. 6 illustrates an adaption of scaling windows according to an embodiment, FIG. 7 illustrates another example of an extraction of a subpicture specific video data stream, FIG. 8 illustrates an example of an output picture area fraction of a subpicture specific video data stream, FIG. 9 illustrates examples of fractions of a subdivided layer and a non-subdivided layer of a reference decoder capability requirement, FIG. 10 illustrates examples of encoders, video data streams, an apparatus for mixing and/or extracting video data streams and a decoder, FIG. 11 illustrates an example of a bistream that mixes decoder side boundary treatment and encoder side boundary treatment, FIG. 12 illustrates an example of a single layer bitstream mixing decoder side and encoder side boundary treatment, FIG. 13 illustrates an example of bitstream portions depending on types of independency.

In the following, embodiments are discussed in detail, however, it should be appreciated that the embodiments provide many applicable concepts that can be embodied in a wide variety of video coding concepts. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein.

In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

The following description of the figures starts with the presentation of an encoder, an extractor and a decoder with respect to FIG. 1. The encoder and the extractor of FIG. 1 provide an example for a framework into which embodiments of the present invention may be built in. Thereinafter, the description of embodiments of the concept of the present invention is presented along with a description as to how such concepts could be built into the encoder and the extractor of FIG. 1. Although, the embodiments described with respect to the subsequent FIG. 2 and following may also be used to form an encoder and an extractor not operating according to the framework described with respect to FIG. 1. It is further noted that the encoder, the extractor and the decoder may be implemented separately from each other, although they are jointly described in FIG. 1 for illustrative purpose.

0. Encoder 40, Extractor 10, Decoder 50 and Video Data Stream 14 According to FIG. 1

FIG. 1 illustrates examples of an encoder 40, an extractor 20 and a decoder 50. The encoder encodes a video 24 Into a video data stream 14. The video data stream 14 (video data streams may also be referred to as bitstreams herein) may, for example, be transmitted or may be stored on a data carrier. The video 24 may comprise a sequence of pictures, each of which may be associated with a presentation time of a presentation time order. The video 24 may comprise a plurality of pictures 26, which are represented by pictures $26_0$ and $26_1$ in FIG. 1. Each of the pictures 26 may be associated with a layer, such as a first layer L1 or a second layer L0 in FIG. 1. For example, in FIG. 1, pictures $26_0$ are associated with the second layer L0 and pictures $26_1$ are associated with the first layer L1. Pictures $26_0$ of layer L0 may form a video sequence $24_0$. Pictures $26_1$ of layer L1 may form a video sequence $24_1$. In examples, the video sequences $24_0$, $24_1$ of the video 24 may comprise pictures representing equal content and being associated with equal presentation times but having different resolutions. However, it is noted that video sequences $24_0$, $24_1$ associated with layers L0 and L1 of video 24 may have different frame rates. Thus, for example, the video sequence $24_0$ does not necessarily comprise a picture $26_0$ for each of the presentation times for which the video sequence $24_1$ comprises a picture $26_1$. Encoder 40 may encode a picture $26_1$ of the video sequence $24_1$ into the video data stream 14 in dependence on, that is, with reference to, a picture $26_0$ (e.g. referred to as reference picture, e.g. for inter-layer prediction) of the video sequence $24_0$ which is temporally collocated with the picture $26_1$, that is, which is associated with the same presentation time. In other words, pictures of layer L0 may be reference pictures for pictures of layer L1. Thus, the decoding of the picture $26_1$ from the video data stream 14 may require the picture $26_0$ encoded into the video data stream 14. In these examples, layer L0 may be referred to as a base layer and pictures associated with layer L0 may have a first resolution. Pictures $26_1$ associated with the first layer L1, which may be referred to as enhancement layer, may have a second resolution, which may be higher than the first resolution. For example, encoder 40 may encode in the video 24 into the video data stream 14 such that the layer L0, representing the video 24 at the first resolution, may be decoded from the video data stream 14 independently of the layer L1, resulting in a video of the first resolution. In case that pictures $26_1$ of the layer L1 depend on pictures $26_0$ of layer L0, the video sequences $24_0$, $24_1$ may optionally be decoded jointly, which may result in a video having a resolution higher than the first resolution, e.g. the second resolution. Thus, there may be multiple choices for decoding the video data stream 14, the individual choices coming with different data rates of the data stream to be decoded and resulting in videos having different resolutions.

It is pointed out that the number of layers shown in FIG. 1 is exemplarily and that the video data stream 14 may have more than two layers. It is also noted that the video data stream 14 does not necessarily comprise a plurality of layers but may, in some examples, comprise only one single layer, such as in examples of the embodiments described in section 6.

The extractor 10 may receive the video data stream 14 and may extract therefrom a not necessarily proper subset of bitstream portions of the video data stream 14 so as to provide an extracted video data stream 12. In other words, the extracted video data stream 12 may correspond to the video data stream 14 or may include apportion of the video data stream 14. It is pointed out that the extractor 10 may optionally modify content of the bitstream portions of the video data stream 14 when forwarding the bitstream portions in the extracted video data stream 12. For example, the extractor 10 may modify descriptive data comprising information about how to decode coded video data of the extracted video data stream 12.

The extractor 10 may select bitstream portions of the video data stream 14 to be forwarded to the extracted video data stream 12 on the basis of an output layer set (OLS) which is to be extracted from the video data stream 14. For example, extractor 10 may receive an OLS indication indicating an OLS to be extracted or to be presented. The video data stream 14 may include an OLS indication indicting a set of OLSs extractible from the video data stream 14. An OLS may indicate one or more or all of the layers of the video data stream 14 to be, entirely or partially, forwarded to the extracted video data stream 12.

In other words, an OLS may, for example, indicate a (not necessarily proper) subset of the layers of the multi-layered video data stream 14. The OLS may be Indicated in the multi-layered data stream itself such as in an OLS indication 18, which might be included in a video parameter set (VPS) of the bitstream 14. In fact, more than one such OLS might be Indicated in the data stream 14 with the one used for extraction being determined by external means, for example, via an API 20. Note, the OLS indication 18, while primarily indicating one or more layers of the video which are to be output or presented, might also indicate non-output reference layers, which are not to be output/presented, belonging to the one or more output layers in that the one or more output layers depend on the layer directly or indirectly (via another reference layer). The OLS indication 18 may indicative one or more OLSs.

Optionally, the OLS indication 18 may be indicative of video parameters for the OLS, e.g. in a video parameter set (VPS). For example, the video parameters may indicate reference decoder capability requirements (also referred to as decoder capability requirements, (reference) level information, or (reference) level indication), which pose requirements on a decoder for being capable of decoding a bitstream described by the OLS. It is noted, that the video parameters may indicate one or more reference decoder capability requirements for one OLS, as the bitstream described by an OLS may, also after extraction by extractor 10, still be scalable by selection/extraction of one or more temporal sublayers and/or one or more layers of the OLS. E.g., a mixer or merger (e.g. apparatus 100 of FIG. 10) may form a bitstream using the extracted video data stream 12, or a decoder may select a sub-bitstream of the extracted video data stream 12 for decoding.

The extracted video data stream 12 is forwarded to the decoder 50, which decodes the extracted video data stream 12 so as to obtain a decoded video 24'. The decoded video 24' may differ from the video 24 in that it does not necessarily include the entire content of the video 24, and/or may have another resolution and/or may have a distortion, e.g., based on quantization loss, with respect to the video 24.

Pictures 26 of one of the layers of the video data stream 14 may include one or more subpictures 28 or may be subdivided into a plurality of subpictures 28. It is noted that reference sign 26 will be used in the following for referring to pictures of layers, pictures 26 may refer to a picture $26_1$ of layer L1 or a picture $26_0$ of layer L0, for instance. Encoder 40 may encode subpictures 28 of a picture 26 mutually independently from each other. that is, one of the subpictures 28 of a picture 26 may be decoded without requiring another subpicture 28 of the picture 26. For example, extractor 10 does not necessarily forward all subpictures 28 of a layer, but may forward a subset, or only one, of subpictures 28 of each of pictures 26 of a layer. Consequently, the data rate of the extracted video data stream 12, which in this case may be referred to as subpicture specific video data stream 12, may be lower than a data rate of the video data stream 14, so that decoding of the extracted video data stream 12 may require less decoder resources. In the example of FIG. 1, extractor 10 forwards pictures $24_0$ of layer L0 and subpictures 28 of pictures $26_1$ of layer L1. In this scenario, the decoded video 24' comprises a decoded video sequence $24'_0$, representing decoded pictures of the video sequence $24_0$. Further, the decoded video sequence 24' according to this example comprises a decoded video sequence $24'_1$ representing decoded pictures $26'_1$ which include subpicture 28 of the pictures $26_1$ of the video sequence $24_1$.

Note that the encoder not only indicates the one or more meaningful/extractible layer sets in the OLS indication, but also, according to an embodiment, provides the data stream with information which the decoder may use to decide whether a certain OLS indicated is decodable by the decoder in terms of, for instance, available buffer memory for DPB and/or CPB, processing kernels, wanted decoding delay, or the like; this information may be included in the decoder capability requirement information.

After having described very generally the concept of multi-layered video data streams, subpictures, bitstream scalability and reference pictures, in the following several embodiments for implementing the extraction process of the extracted video data stream 12 from the video data stream 14 and associated indications in the video data stream 14 and/or ways of encoding the video data stream 14 are described. It is noted that features described with respect to the extraction process also represent a description of the corresponding video data stream from which the extracted video data stream is to be extracted and of the corresponding encoding process of the video data stream. For example, a feature specifying the extractor 10 to derive an information from the video data stream 14 is also to be understood as a feature of the video data stream 14 being such that the information is derivable from the video data stream, and as a feature of the encoder 40 in terms of encoding the video data stream 14 accordingly.

1. Encoder 40, Extractor 10 and Video Data Stream 14 According to the First Aspect This section describes embodiments according to the first aspect making reference to FIG. 1, wherein details described in section 0 may optionally apply to embodiments according to the first aspect.

According to embodiments of the first aspect, the extractor 10 of FIG. 1, which may also be referred to as apparatus 10 for extracting a subpicture specific video data stream, is configured for extracting the subpicture specific video data stream 12 out of the multi-layered video data stream 14. That is, according to the first aspect, the video data stream 14 comprises multiple layers, and comprises bitstream portions 16, each of which belongs to one of the layers, for example, layers L0, L1, of the multi-layered video data stream 14.

For example, each of the bitstream portions 16 may include an indication, such as a layer ID, which indicates the layer to which the respective bitstream portion 16 belongs. According to embodiments of the first aspect, the extractor 10 is configured for checking, for each layer out of a layer set, whether the respective layer has encoded thereinto the video 24 in a manner so that pictures (e.g. pictures $26_1$, $26_2$, i.e. the pictures encoded into the respective layer) of the video are subdivided into two or more subpictures 28, which are encoded into the respective layer in a manner mutually Independent so that, for each picture $26_1$, $26_2$ of the video 24, the subpictures 28 of the perspective picture are encoded into mutually different bitstream portions 16 of the respective layer, or whether the respective layer has encoded thereinto the video 24 in a non-subpicture subdivided manner.

For example, the layer set is a layer set indicated by an OLS, e.g. as described with respect to FIG. 1, which OLS extractor 10 is instructed to extract by external means such as API 20, or which OLS extractor infers to be extracted, e.g. in absence of a respective instruction.

For example, the subpictures 28 being encoded mutually independent from each other may signify that each subpicture 28 is encoded Independently from any other subpicture (of the picture to which the subpicture belongs) and each bitstream portion 16 has only one (not more than one but maybe only a part of one) subpicture encoded thereinto. In other words, an Independently coded subpicture 28 may not require, out of the bitstream portions 16 into which the picture to which the subpicture 28 belongs is coded, bitstream portions other than the bitstream portions into which the independently coded subpicture 28 is coded. Having encoded the video 24 in a non-sub picture subdivided manner may signify, for example, that a number of subportions into which the respective layer is coded is one, or that the number of subportions coded into the respective layer is one. In other words, being encoded in a non-subpicture subdivided manner may signify to be encoded in a manner where each picture is encoded as one subpicture.

If the respective layer has encoded thereinto the video in a non-subpicture subdivided manner, e.g. layer L0 of FIG. 1, the extractor 10 may take over, from the mufti-layered video data stream 14, into the subpicture specific video data stream 12, the bitstream portions 16, which belong to the respective layer (the dotted bitstream portions 16 in video data streams 14 and 12 of FIG. 1) so that the subpicture specific video data stream 12 has the video 24 of the respective layer, e.g., video sequence $24_0$ in FIG. 1, encoded thereinto completely. Having the video of the respective layer encoded thereinto completely may signify, for example, that all of the bitstream portions 16 of the respective layer, e.g., layer L0 of the multi-layered video data stream 14 are included in the subpicture specific video data stream 12. Alternatively or additionally, the subpicture specific video data stream having the video 24 of the respective layer encoded thereinto completely may signify that the bitstream portion 16 taken over into the subpicture specific video data stream 12 are independent from the selection of which of the two or more subpictures of another layer are forwarded in the subpicture specific video data stream 12, i.e., belong to the predetermined set of one or more subpictures mentioned below.

If the extractor finds that the respective layer, that is, the currently checked layer, has encoded thereinto the video 24, e.g., video sequence 24, of layer L1, in a manner so that pictures 26 of the video of the layer, e.g., pictures $26_1$ of layer L1 are subdivided into two or more subpictures 28, the extractor 10 may, for each bitstream portion 16, which belongs to the respective layer, such as layer L1 in FIG. 1, read from the bitstream portion 16 an information revealing which subpicture of the two or more subpictures, the respective bitstream portion 16 has encoded thereinto. The extractor may take over from the multi-layered video data stream 14 into the subpicture specific data stream 12 the respective bitstream portion 16 of the respective layer, if the respective bitstream portion 16 has encoded thereinto a subpicture which belongs to a predetermined set of one or more subpictures. E.g., In FIG. 1, the predetermined set of subpictures includes only the subpicture 28 shown in cross hatch. For example, the extractor 10 may drop or leave or remove, i.e., not forward, each bitstream portion which belongs to the respective layer, but which has encoded thereinto a subpicture which does not belong to the predetermined set of one or more subpictures.

FIG. 2 illustrates more detailed the information signaled in the video data stream 14 and the subpicture specific video data stream 12 according to embodiments of the first aspect of the invention with respect to the scenario shown in FIG. 1. According to the exemplarily illustration of FIG. 2, the predetermined set of subpictures comprises only one subpicture 28, namely the crosshatched subpicture 28 of pictures $26_1$ of the layer L1. As illustrated in FIG. 2, based on the finding that the layer L0 has encoded thereinto the video, i.e., the video sequence $24_0$, in a non-subpicture subdivided manner, extractor 10 forwards or takes over all bitstream portions 16 (the dotted ones) associated with the layer L0. Bit stream portions associated with the layer L1 are encoded into the video data stream 14 in a subpicture divided manner. In the example of FIG. 2, bitstream portions into which the subpictures 28 of the pictures $26_1$ of the layer L1 are coded are Illustrated in cross hatch, and bitstream portions into which a further subpicture of the pictures $26_1$ is coded are Illustrated simply hatched. As illustrated in FIG. 2, bitstream portions belonging to pictures of equal presentation time may be part of a common access unit (AU). Further, it is noted that each picture 26 or subpicture 28 may be coded into one or more bitstream portions 16. For example, a picture 26 or subpicture 28 may be further subdivided into slices, each of which may be coded into one or more bitstream portions. In the illustrative example of FIG. 2, the predetermined set of subpictures 28, i.e., the set of one or more subpictures to be forwarded in the subpicture specific video data stream 12 for decoding, has only one subpicture, namely the cross-hatched subpicture 28. Thus, of the bitstream portions associated with pictures $26_1$ of layer L1, only the cross hatched bitstream portions of subpicture 28 are forwarded in a subpicture specific video data stream 12.

In other words, the apparatus 10 may be sensitive to the layer being coded in units of two or more independently coded subpictures 28 or not in taking over the layers' bitstream portions 16 into substream 12.

For example, the predetermined set of one or more subpictures may be provided to extractor 10 by external means, such as an API 20. That is, extractor 10 may receive an information about which subpictures of the pictures 26 of the layers of the multi-layered video data stream 14 are to be forwarded to decoder 50.

For example, the information revealing to which bitstream portion a subpicture 28 of the two or more subpictures of a layer encoded in a subpicture subdivided manner belongs may be provided by a subpicture identifier, for example, SH_subpic_ID. For example, this information, i.e., the subpicture identifier, may be provided in a header of the respective bitstream portion, e.g., a sliced header. In other words, a bitstream portion 16 having encoded thereinto video data of one of the pictures 26 or subpictures 28 may have associated therewith, in descriptive data of the bitstream portion, a subpicture identifier indicating, for example, by means of an index, a subpicture, to which the bitstream portion belongs.

In examples, the video data stream 14 may comprise an association table 30, such as subpicIDVal which is used to associate the subpicture identifiers in the bitstream portions with a subportions spatial position in the pictures of the video 24.

According to embodiments, the extractor 10 may perform the checking whether a layer has encoded thereinto a video in a non-subpicture subdivided manner or in a subpicture subdivided manner by evaluating a syntax element signaled in the video data stream 14 for the respective layer. For example, the respective syntax element may be signaled in a sequence parameter set to which the respective layer is associated. For example, the syntax element may reveal a number of subpictures or subportions coded into the respective layer. The syntax element may be contained in picture or subpicture configuration data 22, which may in examples be signaled in the video data stream 14, for instance, the sequence parameter set (SPS). For example, the respective syntax element may be a sps_num_subpics_minus1 syntax element.

As illustrated in FIG. 2, the video data stream 14 may optionally comprise an OLS indication 18, which is indicative of a layer set, e.g., an OLS, e.g., the layer set indicated to be forwarded, at least partially, in the subpicture specific video data stream 12. As described before, the OLS indication 18 may, for example, comprise a set of OLSs including the layer set which is indicated to be forwarded in the subpicture specific video data stream 12. For example, an API 20 indicates to the extractor 10 which of the OLSs of the OLS indication 18 is to be forwarded in the subpicture specific video data stream 12, for example, by indicating an index pointing to one of the OLSs of the OLS indication 18.

The video data stream 14 may optionally further comprise a decoder capability requirement information 60, which may, for example, comprise information on picture sizes, buffer sizes such as buffer sizes of CPB and/or DPB, and similar information, e.g., HRD, DPD and TPL information. The information may be given in the video data stream 14 in the form of a list of various versions thereof, with the version applying to a certain OLS being referred to by indexing. That is, for a certain extractible OLS, e.g., an OLS indicated by the OLS indication 18, an index may be signaled which points to the corresponding HRD, DPD and/or TPL information.

The decoder capability requirement information 60 may be information on the subpicture specific video data stream 12 which is extractible from the multi-layered video data stream 14. For example, the decoder capability requirement information 60, or a portion thereof, may be determined by the encoder 40 by actually performing the extraction process in a manner like extractor 10 would perform the extraction process for extracting the perspective extractible subpicture specific video data stream 12, wherein the encoder 40 may perform the extraction process at least to some extent in order to determine certain parameters of the decoder capability requirement information 60.

Note that the extractor 10 might adapt some data when forming data stream 14 out of data stream 12. In FIG. 1 this possibility is indicated by usage of an apostrophe for reference sign 16 of bitstream portions of video data stream 12. Same holds for of components of stream 12 as illustrated in FIG. 2, which may also optionally be part of the video data stream 12 of FIG. 1. These components may also be present in embodiments of the video data streams 14 and 12 according to the further aspects described herein. For instance, the picture configuration data 22 in the stream 14 is indicative of the picture size of the full pictures 26 coded into the data stream 14, while the picture configuration data 22' in the stream 12 is indicative of the picture size of the pictures 26' coded into the data stream 14 which, as far as layer L1 is concerned, are now coded into stream 12 non-subpicture-subdivided, i.e. picture $26_1'$ from one subpicture 28; the bitstream packets 16 having the actual picture content encoded thereinto, such as the VCL NAL units, might be taken over as they are, without any amendment, at least with respect to the arithmetically coded portion thereof. As can be seen, even the OLS indication 18' might be taken over from stream 14 into stream 12. It might even be left as it was in stream 14; The association table 30 may have been amended accordingly as well; amended version of any of data items 18, 20 and 22 may be hidden/nested in the stream 12, i.e. may have been provided therein by encoder 40, and may thus simply be used by the extractor to replace the corresponding overruled version as occurring in stream 12 when forming stream 14, or may be construed by the extractor on the fly based on the overall information in stream 14 and placed into stream 12; the decoder 50, when receiving or being fed with stream 12, may no longer be in a position to see as to how the pictures $26_1$ of the subpicture subdivided layers L1 once looked like in stream 14.

Note that, in dependency on the check, the extractor 10 might further decide whether certain layer specific parameter sets such as PPS and SPS are adapted or generated anew accordingly from the scratch, so that certain parameter therein are adapted to the subpicture specific data stream 12. Such parameters comprise the afore-mentioned picture size and subpicture configuration in the picture or subpicture configuration data 22, cropping window offsets, level indicator. Thus, such adaptations such as the adaptation of the picture or subpicture configuration data 22 in data stream 12 in terms of picture size and subpicture configuration, do not take place for not-subpicture-subdivided layers, i.e. "if the respective layer has encoded thereinto the video in a non-subpicture-subdivided manner", but take place "if the respective layer has encoded thereinto the video (24) in a manner so that pictures (26) of the video are subdivided into two or more subpictures (28)".

For example, as pictures $26_0$ are forwarded in the subpicture specific video data stream 12, these pictures are available as reference layers, e.g. for subpictures 28 of a layer L1. For example, as described with respect to FIG. 1, multi-layered video data stream 14 may allow for scalability, e.g. of the data rate of the data stream. To this end, a base layer, e.g. layer L0, may have encoded thereinto the video in a first resolution, and an enhancement layer, e.g. layer L1 may be such a layer, may have encoded thereinto information about the video for a second resolution higher than the first resolution. For example, the decoding of pictures $26_1$ encoded into the enhancement layer may require information of a temporally collocated picture of the base layer. In other words, the base layer may be a reference layer of the enhancement layer. Thus, in this scenario, if both the base and the enhancement layer are part of the set of layers, it may be ensured that a reference picture, which is part of the base layer, of a subpicture of the enhancement layer is available in the subpicture specific video data stream. Further, in examples in which the lower resolution video is coded into the base layer in a non-subpicture-subdivided manner, and consequently, according to the presented concept the bitstream portions of the base layer are taken over into the subpicture specific video data stream. Therefore, it may be ensured that at least a low resolution video of the entire video content is available in the subpicture specific video data stream, so that in case of a change of the subpicture to be presented, and thus to be decoded, at least a low resolution picture of the base layer is immediately available to the decoder, allowing for a quick change of the subpicture.

In other words, when scalable coding is used in conjunction with subpictures, e.g. in a viewport dependent 360-degree video streaming scenario, one common setup is to have a low-resolution base layer depicting the whole 360-degree video scene and an enhancement layer containing the scene in higher fidelity or spatial resolution but wherein the enhancement layer picture is subdivided into several independently coded subpictures. In such a setup, it is possible to extract a single subpicture from the enhancement layer and the non-subpicture base layer, e.g. a picture portion that corresponds to the viewing direction of a client, and decode it alongside the full-360-degree video base layer.

In case of a bitstream configuration such as mentioned above (subpictures with non-subpic reference layers) that state of the art extraction process such as in the WC specification will not result in a conformant bitstream. For instance, the following step is carried out for each layer i in the extracted OLS in the subpicture sub-bitstream extraction process of the current WC draft specification when extracting the subpicture with index subpicIdx after creating the temporary outBitstream from a verbatim copy of inBitstream (e.g. so as to derive the OLS indication 18' from the OLS indication 18):

Remove from outBitstream all VCL NAL units with nuh_layer_id equal to the nuh_layer_id of the i-th layer and with sh_subpic_id not equal to SubpicIdVal[subpicIdx], i.e. take over into the extracted bitstream only the VCL NAL units with nuh_layer_id equal to the nuh_layer_id of the i-th layer and with sh_subpic_id equal to SubpicIdVal[subpicIdx].

Note that all VCL NAL units having a subpicture ID different than the subpicture to be extracted are removed.

Wherein SubpicIdVal is a AU specific mapping from subpicture index Idx order in which subpicture appear in the bitstream and related signalling structures and identifier ID value which is carried in slice headers of the slices belonging to the subpicture as the syntax element sh_subpic_id and facilitated for instance by an extractor to identify the subpicture during extraction.

FIG. 3 illustrates an example of a multi-layered video data stream 14, which may be an example of the video data stream 14 as described with respect to FIGS. 1 and 2. According to FIG. 3, a sequence of four access units of the video is illustrated. Each of pictures $26_1$ of the layer L1 is subdivided into two subpictures, a first subpicture indexed with index 0, and a second subpicture indexed with index 1, while pictures $26_0$ of layer L0 are coded in a non-subdivided manner.

Conventionally, when an original bitstream as depicted in the top of FIG. 3 is subject to extraction of a subpicture, e.g. subpicidx 1, a non-conformant bitstream 12* would be created as L1 would be missing its inter-layer reference pictures (ILRP) from L0 as seen in the bottom of FIG. 3. Note that it is possible that subpicture IDs change in the course of a bitstream, so extraction is index based. It is clear that such a step would result in removing all NAL units, e.g., bitstream portions, from non-subpicture layers, as they have subpicture index 0.

Embodiments according to the first aspect may thus allow for an extraction of a subpicture specific video data stream in scenarios, in which the subpicture specific video data stream comprises non-subpicture layers. In other words, the embodiments may allow for an extraction of a subpicture specific video data stream in which the subpictures may have references to a non-subpicture layer.

In other words, embodiments according to the first aspect of the invention, in contrast, may allow to extract (i.e. remove) NAL units from each layer in the OLS depending on its subpicture configuration. For instance, in one embodiment, the above removal step is conditioned on the presence of subpicture, e.g. through the number of subpictures in the layer SPS as follows:

When sps_num_subpics_minus1 is greater than 0, remove from outBitstream all VCL NAL units with nuh_layer_id equal to the nuh_layer_id of the i-th layer and with sh_subpic_id not equal to SubpicIdVal[subpicIdx].

Note in particular the part "when sps_num_subpics_minus1 is greater than 0", restricting the removing of VCL NAL units to layers or pictures having at least two subpictures.

In another embodiment, additional steps of said extraction process with respect to non-VCL NAL units of each layer such as SPS/PPS adjustments regarding the picture size, cropping window offsets, level idc and subpicture configuration are omitted based on the presence of subpicture as follows.

The output sub-bitstream outBitstream is derived as follows:

The sub-bitstream extraction process, specified in Annex C.6, is invoked with inBitstream, targetOlsIdx, and tIdTarget as inputs and the output of the process is assigned to outBitstream.

If some external means not specified in this Specification is available to provide replacement parameter sets for the sub-bitstream outBitstream, replace all parameter sets with the replacement parameter sets.

Otherwise, when subpicture level information SEI messages are present in inBitstream, the following applies:
[ . . . ]
For the i-th layer with i in the range of NumLayersInOls[targetOlsIdx]−1 to 0, the following applies.
When sps_num_subpics_minus1 is greater than 0, the following applies.
[ . . . ] //layer-specific tasks shuch as adjustments to SPS/PPS in terms of level, picture size, //conformance window, and subpicture parameters, removal of VCL NAL units Again, note the part "when sps_num_subpics_minus1 is greater than 0", restricting the layer-specific tasks to layers or pictures having at least two subpictures.

FIG. 4 shows an exemplary result of extraction of a subpicture specific video data stream 12 when the above embodiment is used in the extraction process which results in a conforming bitstream.

2. Encoder 40, Extractor 10 and Video Data Stream 14 According to the Second Aspect This section describes embodiments of encoder 40, extractor 10 and video data stream 14 in accordance with the second aspect of the invention. The encoder 40, the extractor 10 and the video data stream 14 according to the second aspect may be in accordance with encoder 40, extractor 10 and video data stream 14 as described with respect to FIG. 1, and may optionally also be in accordance with the first aspect as described with respect to FIG. 2 in section 1.

FIG. 5 illustrates embodiments of the encoder 40, the extractor 10, the decoder 50 and the video data stream 14, In which the video data stream 14 comprises at least a first layer L1 and a second layer L0, for example, as described with respect to FIGS. 1 and 2. Video sequences 24, pictures 26 and subpictures 28 of the scenario exemplarily illustrated in FIG. 5 may be in accordance with the description of the scenarios shown in FIG. 1 and FIG. 2.

According to embodiments of the second aspect, the multi-layered video data stream 14 is composed of, or comprises, bitstream portions 16, e.g., NAL units, each of which belongs to, e.g., as indicated by a layer ID associated with the respective bitstream portion, one of layers of the multi-layered video data stream 14. The multi-layered video data stream 14 comprises a first layer, for example layer L1 in FIG. 5, left-hand side, bitstream portions 16 of which have a first video $24_1$ encoded thereinto in a manner so that pictures $26_1$ of the first video $24_1$ are subdivided into two or more subpictures 28, e.g., the simply hatched and cross hatched halves of the pictures $26_1$ of layer L1. The subpictures 28 are encoded into the bitstream portions 16 of the first layer L1 in a manner mutually independent, so that, for each picture $26_1$ f the first video $24_1$, the subpictures 28 of the respective picture of the first video are encoded into mutually different bitstream portions 16 of the first layer L1. For example, as already explained with respect to FIG. 2, the simply hatched subpicture 28 is encoded into the simply hatched bitstream portions of the video data stream 14 and the crosshatched subpictures 28 are encoded into the crosshatched bitstream portions of the video data stream 14. The multi-layered video data stream 14 further comprises a second layer, e.g., layer L0 in FIG. 5, left hand side, the bitstream portions of which have a second video $24_0$ encoded thereinto. For example, the second video $24_0$ relates to video content at least covering, and being temporally aligned to, a video content of the first video $24_1$, so that interlayer prediction of the first video based on the second video is feasible. For example, the video content of picture $26_0$ of layer L0 may cover the video content of the temporally aligned picture $26_1$ of layer L1. The second video $24_0$ is encoded into the second layer L0 of the video data stream 14 in examples, but not necessarily, in a non-subpicture subdivided manner with respect to a spatial picture area of the second video $24_0$ spatially corresponding to the first video $24_1$. In other words, the number of subportions coded into the second layer L0 may be one. In even other words, each picture of the second layer L0 may be encoded as one subpicture, or, for example, alternatively, if subdivided into subportions, it could be that one subportion covers the footprint of the first video completely. The first layer's bitstream portions, that is, the crosshatched and the simply hatched ones, have the first video $24_1$ encoded thereinto using vector based prediction from reference pictures. Further, the first layer's bitstream portions have the first video 24, encoded thereinto in a manner including (e.g., at least) pictures of the second video $24_0$ as the reference pictures, and in a manner where vectors 70 using which the first layers bitstream portions are encoded and which are comprised by, or signaled by, the first layer's bitstream portions are, for use in the vector based user prediction, to be scaled and offset according to sizes and positions of scaling windows 72 in the multi-layered video data stream 14 for the pictures $26_1$ of the first video and the reference pictures $26_0$, respectively.

For example, pictures of the second video $24_0$ are at least included in the reference pictures using which the first layer's bitstream portions have been encoded using vector-based prediction. For instance, the picture $26_0$ of FIG. 5 may be a reference picture of picture $26_1$. In other words, pictures $26_0$ of the second video $24_0$ may serve as inter layer reference pictures for encoding pictures $26_1$ of the first video $24_1$. For example, the vector based prediction might be included into a motion vector based prediction framework, where the term "motion" generally refers to the fact that picture content in the first video $24_1$, which is predicted from some reference picture, is moved from its corresponding picture content in the reference picture, from which it is predicted, spatially by some vector. That is, it is displaced therefrom, wherein the reference picture might be a previously coded picture of the first video $24_1$ or a co-temporal or temporally aligned picture of the second video $24_0$, for instance. For example, the pictures 26 depicted on top of each other in the illustration of the first video $24_1$ and the second video $24_0$ in FIG. 5 may be such pictures.

The offsetting of the vectors 70 according to sizes and positions of scaling windows 72 may, for example, be performed according to positional offset between the scale windows, e.g., the scale windows $72_0$ of layer L0 and the scaling windows $72_1$ of layer L1. Further, for example, the scaling of the vectors 70 according to sizes and positions of the scaling window 72 may be performed according to a size ratio between the scaling window, e.g., the scaling windows $72_0$ and $72_1$.

For example, sizes and positions of the scaling window 72 may be signaled in the multi-layered video data stream 14 by means of a scaling window indication 72, for example, on a per picture basis. For example, the sizes and positions of the scaling window 72 may be signaled by indication of positions of two opposing corners of the scaling windows, or a position of one corner and the dimensions of the scaling windows in x and y. Note that it might also be feasible to signal certain positionings of the scaling window differently than using coordinates or coordinates and dimensions of the same, such as by indicating that the scaling window coincides with a picture boundaries using a corresponding flag. In the latter case, in examples, only if the flag does not indicate coincidence of the positioning of the scaling window with picture boundaries, the positioning of the scaling window is indicated using coordinates or the like.

The extractor 10 according to the second aspect is configured to take over, from the multi-layered video data stream 14, into the subpicture specific video data stream 12, the bitstream portions which belong to the second layer L0 so that the subpicture specific video data stream 12 has the video $24_0$ of the respective layer encoded thereinto completely. For example, the extractor 10 may forward all of the bitstream portions 16 of layer L0 or may forward the bitstream portions associated with layer L0 independent from which of the two or more subpictures of the first layer L1 are forwarded to the subpicture specific video data stream 12, i.e., which of the subpictures of the first layer L1 belong to the predetermined set of one or more subpictures as described in the following. In other words, the apparatus according to the second aspect may take over the bitstream portions of the second layer L0, for example, as described with respect to FIG. 1 and FIG. 2 for the case of layer L0 which is encoded in a non-subpicture subdivided manner.

The extractor 10 according to the second aspect is further configured to take over from the multi-layered video data stream 14 into the subpicture specific video data stream 12 each bitstream portion which belongs to the first layer L1, and which has encoded thereinto is subpicture 28, which belongs to a predetermined set of one or more subpictures. For example, extractor 10 may drop or leave, i.e. not forward, each bitstream portion that belongs to the respective layer, e.g., layer L1, but which has encoded thereinto a subpicture 28 which does not belong to the predetermined set of one or more subpictures. In other words, extractor 10 according to the second aspect may selectively forward bitstream portions of the first layer L1 which belong to the set of predetermined set of subpictures as described with respect to the first aspect, cf. FIG. 1 and FIG. 2. As described with respect to FIG. 1 and FIG. 2, the predetermined set of one or more subpictures may be indicated by an information provided to the extractor 10 by an API.

The extractor 10 is further configured to adapt a scaling window signalization 74 for the first layer L1 and/or the second layer L0 in the subpicture specific video data stream 12 so that a spatial area of the scaling window $72_0'$ for the pictures of the second video spatially corresponds to a spatial area of the scaling window $72_1'$ for the predetermined set of one or more subpictures.

As illustrated in FIG. 5, after extraction of the subpicture specific video data stream 12, the subpictures defined by the predetermined set of one or more subpictures become, or make up the pictures $26_1'$ of the first layer L1 of the data stream 12 owing to the extraction and tailoring to the subpictures of the predetermined set of one or more subpictures, e.g., subpicture 28 in FIG. 5. Extractor 10 may adapt the scaling window signalization so that a scaling of the vectors 70 of the second layer L0 of the subpicture specific video data stream 12 after scaling using the scaling windows $72_0'$, $72_1'$ is associated with, or mapped to a vector 70 having a size and position in the collocated picture $26_1'$ of the first layer L1 of the subpicture specific video data stream 12, which size and position corresponds to those of the vector 70 to which the vector 70 of the picture of the second layer L0 is associated with, or mapped to using the scaling windows $72_0$, $72_1$ in the multi-layered video data stream 14.

In other words, extractor 10 may adapt the scaling window signalization 74 so that the scaling window $72_0'$, $72_1'$ provide for a determination of the vector 70 of a given position within the picture $26_1'$ of the first layer L1 of data stream 12, which determination results in a vector of the size and the position corresponding to the vector 70 of the corresponding position in the pictures $26_1$ of layer L1 of the multi-layered video data stream 14 (the corresponding position corresponding to the position within the picture $26_1'$ rather content wise than relative to boundaries of the pictures). As, however, the size of the picture $26_1'$ may have changed with respect to the picture $26_1$, the scaling windows, when defined relative to boundaries of the pictures, may need to be adapted or shifted with respect to their position relative to the boundary of the picture $26_1'$.

According to embodiments, the extractor 10 may adapt the scaling window signalization 74 for the first layer L1 so that the scaling window $72_1'$ of the first layer L1 corresponds in position and size to the scaling window $72_0'$ of the second layer. This example is illustrated in FIG. 5 by means of the scaling window $72_0'$, $72_1'$ depicted in continuous lines.

Alternatively, the extractor 10 may adapt the scaling window signalization 74 by defining the scaling window $72_0'$ of the second layer L0 so as to coincide with the outer circumference of the predetermined set of one or more subpictures as indicated by the scaling window $72_0'$, $72_1'$ depicted in dashed lines in FIG. 5, or also illustrated in FIG. 6.

According to further embodiments, the extractor 10 may adapt the scaling window signalization for both of the first and the second layer, i.e. adapt scaling windows $72_0'$ and $72_1'$ so that circumferences of scaling windows $72_0'$ and $72_1'$ coincide.

For example, the extractor 10 may adapt the scaling window signalization 74 by using a subpicture configuration data 22 in data stream 14. In other words, the extractor 10 may adapt the subpicture configuration data 22 in data stream 14, so as to provide the subpicture configuration data 22' in data stream 12. For example, the subpicture configuration data 22 may comprise an indication of a scaling window position and size. Extractor 10 may adapt the scaling window position and size in configuration data 22 so as to obtain the subpicture configuration data 22'.

It is noted that the same notes regarding the adaption or inclusion in a hidden manner or anew generation of bitstream portions by extractor 10 as provided with respect to FIG. 2 also apply to FIG. 5 (cf. apostrophe used for bitstream portions of data stream 12), wherein the information 74 is another example for an information which may be included in a hidden manner by encoder or may be adapted or generated by the extractor anew on the fly.

FIG. 6 illustrates the above-mentioned example in which the scaling window $72_0'$ of the second layer L0 is adapted by extractor 10. In other words, FIG. 6 shows an example of an adjustment of scaling windows in case of extraction of the right subpicture of layer L1 and layer L0.

An exemplary specification for an implementation for adapting the scaling windows is shown in the following.

The output sub-bitstream outBitstream is derived as follows:

The sub-bitstream extraction process, specified in Annex C.6, is invoked with inBitstream, targetOlsIdx, and tIdTarget as inputs and the output of the process is assigned to outBitstream.

If some external means not specified in this Specification is available to provide replacement parameter sets for the sub-bitstream outBitstream, replace all parameter sets with the replacement parameter sets.

Otherwise, when subpicture level information SEI messages are present in inBitstream, the following applies:
[ . . . ]
For the i-th layer with i in the range of NumLayersInOls[targetOlsIdx]−1 to 0, the following applies.
When sps_num_subpics_minus1 is greater than 0, the following applies.
[ . . . ] //other layer-specific tasks such as adjustments to SPS/PPS in terms of level, picture //size, conformance window, and subpicture parameters, removal of VCL NAL units
j
The variables subPicLeftPos, subPicRightPos, subPicTopPos and subPicBottomPos are derived as follows:

subPicLeftPos=sps_subpic_ctu_top_left_*x*[subpicIdx]
    *CtbSize*Y*        (C.XX)

subPicRightPos=subPicLeftPos+(sps_subpic_
    width_minus1[subpicIdx]+1)*CtbSize*Y*        (C.XX)

subPicTopPos=sps_subpic_ctu_top_left_
    *y*[subpicIdx]*CtbSize*Y*        (C.XX)

subPicBottomPos=subPicTopPos+(sps_subpic_he-
    ight_minus1[subpicIdx]+1)*CtbSize*Y*        (C.XX)

[ . . . ] //remaining other layer-specific tasks such as adjustments to SPS/PPS in terms of //level, picture size, conformance window, and subpicture parameters, removal of //VCL NAL units
Otherwise (sps_num_subpics_minus1 is equal to 0, the following applies.
Rewrite the values of pps_scaling_win_left_offset, pps_scaling_win_right_offset, pps_scaling_win_top_offset, and pps_scaling_win_bottom_offset in all the referenced PPS NAL units to be equal to subPicLeftPos, (ppsPicWidth–subPicRightPos), subPicTopPos, and (ppsPicHeight-subPicBottomPos), respectively.

The embodiments according to the second aspect described with respect to FIG. 5 and FIG. 6 allow for a combination of inter-layer prediction and extraction of a subpicture specific video data stream such as data stream 12, as the vectors 17 used in the vector based prediction may be mapped correctly in the decoding of the extracted subpicture specific video data stream 12.

In other words, while the original bitstream contains control information that steers inter-layer prediction to apply the correct upscale filters and MV offsets through a so-called scaling window in the respective PPSs, it is important to adjust such high-level parameters in the sub-bitstream that results from extraction of one EL subpicture+full BL to allow correct decoding. Therefore, as part of the aspect of this chapter, scaling window offset parameters are adjusted to compensate for the dropped subpictures of the enhancement layer in terms of an MV offset and a scaling factor derivation. In FIG. 6, an example with two subpictures in the enhancement layer is illustrated and how the scaling windows of base layer L0 and enhancement layer L1 is adjusted to result in correct inter-layer prediction on decoder side as originally performed on encoder side, i.e. the scaling window in the layer containing the subpicture (L1) is to be rewritten to encompass the complete coded picture area after extraction that corresponds only to the extracted subpicture as illustrated on the right-hand side of FIG. 6, whereas the scaling window of the layers without subpicture (L0) is to be rewritten to encompass only the picture areas that correspond to the extracted subpicture of higher layers, i.e. encompassing the samples required for prediction of the remaining L1 coded picture area or subpicture. Similar applies to the example as described above, according to which the scaling window $72_1'$ of the first layer L1 from which the one or more subpictures defined by the predetermined set of one or more subpictures are extracted by extractor 10, is adapted.

3. Encoder 40 and Decoder 50 According to the Third Aspect

This section describes embodiments according to the third aspect making reference to FIG. 1, wherein details described in section 0 may optionally apply to embodiments according to the third aspect. Also, details of the data streams 12, 14 as shown in FIG. 2 and FIG. 5 may be included in embodiments of the third aspects, in which case the corresponding description of sections 1 and 2 applies accordingly.

As mentioned before, encoder 40 may apply inter-layer prediction in the encoding of pictures 26 of the video 24. For example, encoder 14 may use inter-layer prediction for encoding of pictures $26_1$ of layer L1. Encoder 40 may, for example, use picture $26_0$ which is temporally collocated with picture $26_1$ for inter-layer prediction in the encoding of the picture $26_1$. For example, encoder 40 may use temporal motion vector prediction (TMVP) to predict motion vectors for the encoding of picture $26_1$. Other examples of methods which may be used for inter-layer prediction are prediction refinement with optical flow (PROF) or motion vector wrap around, which will be described more precisely in the following. As mentioned before a picture used for prediction of a picture to be encoded may be referred to as reference picture of the picture to be encoded.

In cases where TMVP would require resampling the reference picture motion vector (MV) storage, e.g., single layer resolution change or multi-layer spatial scalability (as it may be provided by the multi-layered video sequence 24), a gating variable RprConstraintsActive[currentPic][refPic] is used to disable usage of TMVP as follows.

It is a requirement of bitstream conformance that the picture referred to by sh_collocated_ref_idx shall be the same for all slices of a coded picture and RprConstraintsActive[sh_collocated_from_l0_flag? 0:1] [sh_collocated_ref_idx] shall be equal to 0.

NOTE—The above constraint requires the collocated picture to have the same spatial resolution and the same scaling window offsets as the current picture.

FIG. 7 illustrates an example of an extraction of a subpicture specific video data stream from a multi-layered bitstream, in which a picture $26_1$ of the first layer L1 is subdivided into subpictures 28 and the collocated picture $26_0$ of the second layer L0 is not subdivided, i.e., is coded into a single subpicture. As mentioned before, embodiments within the section are describe with respect to FIG. 1 so that the description of the elements of FIG. 1 and the corresponding reference signs may apply. Further, the description of the corresponding elements with respect to FIG. 2 may also apply to embodiments according to the third aspect.

When layers with subpictures are combined with layers without subpictures in an OLS as explained above (e.g. sections 1 and 2) and no spatial scalability is used as illustrated via the original bitstream on the left-hand side of FIG. 7, an encoder would also be allowed to use TMVP.

However, an issue arises when subpictures are extracted as shown on the right-hand side of FIG. 7 and scaling windows are adjusted during the extraction process to allow inter-layer prediction of sample values to operate properly. After the extraction, conditions for derivation of RprConstraintsActive[currentPic][refPic] have changed and TMVP is disallowed as can be seen from the following section of the current WC draft specification, in particular the part in which "RprConstraintsActive[i][j]" is defined:

Otherwise, the reference picture lists RefPicList[0] and RefPicList[1], the reference picture scaling ratios RefPicScale[i][j][0] and RefPicScale[i][j][1], and the reference picture scaled flags RprConstraintsActive[0][j] and RprConstraintsActive[1][j] are derived as follows:

```
for( i = 0; i < 2; i++ ) {
  for( j = 0, k = 0, pocBase = PicOrderCntVal; j < num_ref_entries[ i ][ RplsIdx[ i ] ]; j++)
  {
    [. . .]
    fRefWidth is set equal to PicOutputWidthL of the reference picture RefPicList[ i ][ j ]
    fRefHeight is set equal to PicOutputHeightL of the reference picture
  RefPicList[ i ][ j ]
    refPicWidth, refPicHeight, refScalingWinLeftOffset, refScalingWinRightOffset,
  refScaling WinTopOffset,
      and refScalingWinBottomOffset, are set equal to the values of
  pps_pic_width_in_luma_samples,
```

-continued

```
         pps_pic_height_in_luma_samples, pps_scaling_win_left_offset.
pps_scaling_win_right_offset,
         pps_scaling_win_top_offset, and pps_scaling_win_bottom_offset, respectively, of
the reference picture
         RefPicList[ i ][ j ]
      RefPicScale[ i ][ j ][ 0 ] =
(( fRefWidth << 14 ) + ( PicOutputWidthL >> 1 )) / PicOutputWidthL
      RefPicScale[ i ][ j ][ 1 ] =
(( fRefHeight << 14 ) + (PicOutputHeightL >> 1 )) / PicOutputHeightL
      RprConstraintsActive[ i ][ j ] = (pps_pic_width_in_luma_samples != refPicWidth
         pps_pic_height_in_luma_samples != refPicHeight | |
         pps_scaling_win left_offset != refScalingWinLeftOffset | |
         pps_scaling_win_right_offset != refScalingWinRightOffset | |
         pps_scaling_win_top_offset != refScalingWinTopOffset | |
         pps_scaling_win_bottom_offset != refScalingWinBottomOffset )
   }
}
```

The part, in which RprConstraintsActive[i][j] is defined, defines conditions which correspond to the note recited earlier in this section, which defines that "The above constraint (the constraint on the reference picture) requires the collocated picture to have the same spatial resolution and the same scaling window offsets as the current picture. Any syntax-based prediction such as TMVP is forbidden when current picture and reference picture are of different size, e.g. single layer resolution change in CVS (coded video sequence) or inter-layer prediction in a spatial scalable bitstream, as such prediction would require special precaution in the involved prediction mechanisms. For instance, syntax such as MV candidates are stored for syntax prediction purposes in an extra regular storage grid, e.g. 16×16 samples, and without resolution change, (CTU-)block boundaries of the current picture are aligned with the boundaries of this regular storage. Hence, finding co-located MV storage position is relatively trivial, whereas, when a sampling ratio unequal to 1 (i.e. resolution change between ref and current picture) occurs or an arbitrary positional offset is used (through different scaling window positions between ref and current picture), said boundaries may not be aligned anymore. Derivation of the correct MV storage position to use for prediction would then be an extra implementation burden and in the case of WC, the design trade off was taken to not integrate special precautions for this case as it is assumed to occur rarely in the main use case of single layer resolution change and multi-layer applications are not the primary target of the codec.

Also, note that currently motion vector prediction does not make use of scaling windows. Scaling windows are only used for sample prediction based on a motion vector used for a block, i.e. the scaling windows define how the motion vectors are to be offset. However, for motion vector prediction scaling windows are ignored and the top left block of a picture is mapped to a top left block (co-located block) of another picture, which in the example illustrated in the figure, when extraction is performed, after extraction is performed, it would lead to completely different co-located blocks when compared to before extraction.

Another tool that is affected similarly as TMVP is prediction refinement with optical flow (PROF), which is part of the affine motion prediction model in WC and is introduced to represent certain types of motion (e.g. zoom in or out, rotation) more efficiently and a CU-based affine motion compensated prediction is applied if this mode is selected. The affine motion model for a CU is described by MVs of two control points located at the top-left and top-right corners (four parameter model) or MVs of three control points located at the top-left, top-right and bottom-left corners (six parameter model). To achieve a finer granularity of motion compensation, prediction refinement with optical flow (PROF) is used to refine each luma prediction subblock, targeting the effect of sample-wise motion compensation. Prediction samples in a luma subblock are refined by adding a difference derived based on the gradients and sample-based motion vector difference. PROF is not applied to chroma samples.

However, in the affine motion prediction process, a flag cbProfFlagLX related to PROF is derived based on RprConstraintsActive[i][j] and a difference in derivation before and after extraction of a subpicture would lead to encoder/decoder mismatches.

Another affected tool is motion vector wrap around, which is used for certain type of content (360-degree video in Equirectangular projection format). For instance, when objects leave the coded picture plane on a vertical boundary of the picture, it usually enters the picture plane on the opposite vertical boundary again as from the nature of the underlying projection. This fact is facilitated in motion vector wrap around by using the opposite boundary for sample padding when a motion vector points outside of the picture.

However, in the sample prediction process, a flag to control motion vector wrap around is derived (refWraparoundEnabledFlag) based on RprConstraintsActive[i][j] and therefore, when a difference in derivation before and after extraction of a subpicture occurs, it would lead to encoder/decoder mismatches similar is in the case of TMVP or PROF.

The third aspect provide a concept for controlling the usage of inter-layer prediction tools such as TMVP, PROF and MV wrap around, so that the above-described issues which may arise when the subpicture specific video data stream is extracted may be avoided. Embodiments according to the third aspect may avoid these issues by controlling use of these inter-layer prediction tools in the encoding of the original bitstream, i.e., the multi-layered video data stream 14 so as to avoid different behavior before and after extraction of a subpicture.

According to embodiments of the third aspect, the encoder 40 for encoding the video 24 into the multi-layered video data stream 14 supports subpicture-wise independent coding. Further, the encoder 40 is configured to encode into the first layer L1 of the multi-layered video data stream 14 a first version $24_1$ of the video 24 using a set of inter-layer prediction tools for the second layer L0 of the multi-layered video data stream 14 and using a first configuration setting for the subpicture-wise independent coding. The encoder 40 according to the third aspect is further configured for encoding into the second layer L0 of the multi-layered video data stream 14 a second version $24_0$ of the video 24 using a second configuration setting for the subpicture-wise independent coding. The encoder 40 is configured for checking whether the first and second configuration setting have a predetermined relationship. If the first and second configuration setting do not have the predetermined relationship, encoder 40 deactivates, or refrains from making use of, a predetermined subset of one or more inter-layer prediction tools.

For example, the first and second configuration setting for the first layer L1 and the second layer L0 may consider, whether (or not) the respective layer is encoded in a subpicture subdivided manner. In other words, the first and second configuration settings may include information about a number of subpictures (e.g. discriminating between one and more than one, a number of one subpictures signifying that the picture is coded in a non-subdivided manner). For example, the first and second configuration setting for the first layer L1 and the second layer L0 may include information about one or more of the subpicture's boundaries, a subpicture identifier, and a boundary treatment of the subpictures.

For example, the predetermined relationship may be such that the first and the second configuration setting have the predetermined relationship if a set of one or more or all of the following conditions is fulfilled:
  the first and second video are encoded into the first and second layers in a manner subdivided into more than one subpicture, respectively,
  the first and second video are encoded into the first and second layers in a manner subdivided into a number of subpictures, respectively, equal among the first and second video,
  the first and second video are encoded into the first and second layers in a manner subdivided into a number of subpictures, respectively, equal among the first and second video, varying the subpictures boundaries spatially coincide,
  the first and second video are encoded into the first and second layers in a manner subdivided into a number of subpictures, respectively, which coincide in subpicture IDs signaling for the subpictures in the multi-layered video data stream,
  the first and second video are encoded into the first and second layers in a manner subdivided into a number of subpictures, respectively, which coincide in boundary treatment for the subpictures.

For example, the predetermined subset of one or more inter-layer prediction comprises one or more of inter-layer motion vector prediction, e.g. TMVP, optical flow refinement of vector based inter-layer prediction, and motion vector wrap around in vector based inter-layer prediction.

For example, the encoder 40 may signal the first and second configuration setting the multi-layered video data stream.

In examples, the encoder 40 may, if the first and second configuration setting have the predetermined relationship, activate or make use of, the predetermined subset of one or more inter-layer prediction tools, or a subset thereof.

According to embodiments of the third aspect, the decoder 50 for decoding the multi-layered video data stream is configured for decoding from the first layer L1 of the multi-layered video data stream, the first version $24_1$ of the video 24 using the set of inter-layer prediction tools for prediction from the second layer L0 of the multi-layered video data stream and using the first configuration setting for the subpicture-wise independent coding. Note that the multi-layered video data stream may be the subpicture specific video data stream 12 or the multi-layered video data stream 14. In other words, although in FIG. 1, decoder 50 is shown to decode the subpicture specific video data stream 12, decoder 50 may also be capable of decoding the multi-layered video data stream 14, as it may, for example, be forwarded by the extractor 10 upon selection of another OLS as in the scenario shown in FIG. 1. As the multi-layered video data stream decoded by decoder 50 may correspond to the subpicture specific video data stream 12, the first version $24_1$ of the video 24 might differ from the version mentioned with respect to the encoder 40 as the multi-layered video data stream may have been subject to an extraction process, as described with respect to FIGS. 1-7. Consequently, the first version 24, of the video mentioned with respect to decoder 50 may, in examples, differ from the one mentioned with respect to the encoder 40 by omission of one or more subpictures. Same applies to the first configuration setting, which with reference to decoder 50 relates to the picture area of the picture coded into the extracted/remaining/normally removed portion of the data stream to be decoded by decoder 50. If, for instance, the multi-layered video data stream entering the decoder only relates to one subpicture 28 of the erstwhile two subpictures containing pictures, the first configuration data would only indicate non-subpicture subdivision.

Decoder 50 according to the third aspect may be configured for decoding, from the second layer L0 of the multi-layered video data stream, i.e., the video data stream provided to decoder 50, the second version $24_0'$ of the video 24' using the second configuration setting for the subpicture-wise independent coding. Decoder 50 is configured for checking whether the first and second configuration settings have the predetermined relationship. If the first and second configuration settings have the predetermined relationship, decoder 50 may deactivate the predetermined subset of one or more inter-layer prediction tools, as described with respect to encoder 40.

According to embodiments, decoder 50 may be configured for subpicture-wise independent decoding including vector clipping at subpicture boundaries and/or boundary padding at subpicture boundaries.

For example, the above introduced variable RprConstrainsActive may represent a comparison of the first and the second configuration settings. For example, encoder 40 and decoder 50 may derive this variable in dependence on whether the first and second configuration settings have the predetermined relationship, i.e. set the variable accordingly, and may use the variable for deciding whether to use the predetermined subset of inter-layer prediction tools.

In one embodiment, the derivation of RprConstraintsActive[i][j] is adjusted as follows:
  Otherwise, the reference picture lists RefPicList[0] and RefPicList[1], the reference picture scaling ratios RefPicScale[i][j][0] and RefPicScale[i][j][1], and the reference picture scaled flags RprConstraintsActive[0][j] and RprConstraintsActive[1][j] are derived as follows:

```
for( i = 0; i < 2; i++ ) {
  for( j = 0, k = 0, pocBase = PicOrderCntVal;j < num_ref_entries [i][ RplsIdx[ i ] ]; j++)
  {
    [. . .]
    fRefWidth is set equal to PicOutputWidthL of the reference picture RefPicList[ i ][ j ]
    fRefHeight is set equal to PicOutputHeightL of the reference picture
RefPicList[ i ][ j ]
    refPicWidth, refPicHeight, refScalingWinLeftOffset, refScalingWinRightOffset,
refScaling WinTopOffset,
        and refScalingWinBottomOffset, are set equal to the values of
pps_pic_width_in_luma_samples,
        pps_pic_height_in_luma_samples, pps_scaling_win_left_offset.
pps_scaling_win_right_offset.
        pps scaling_win_top_offset, and pps_scaling_win_bottom_offset, respectively, of
the reference picture
        RefPicList[ i ][ j ]
    fRefSubpicsEnabled is set equal to sps_subpic_info_present_flag of the reference
picture RefPicList[ i ][ j ] (thus meaning,that here it is checked whether the reference picture
for ILMVP is subdivded into subpictures or not)
    RefPicScale[ i ][ j ][ 0 ] =
((fRefWidth << 14 ) + (PicOutputWidthL >> 1 )) / PicOutputWidthL
    RefPicScale[ i ][ j ][ 1 ] =
((fRefHeight << 14 ) + ( PicOutputHeightL >> 1 )) / PicOutputHeightL
    RprConstraintsActive[ i ][ j ] = ( pps__pic_width_in_luma_samples != refPicWidth ||
        pps_pic_height_in_luma_samples != refPicHeight ||
        pps_scaling_win_left_offset != refScalingWinLeftOffset ||
        pps_scaling_win_right_offset != refScalingWinRightOffset ||
        pps_scaling_win_top_offset != refScalingWinTopOffsetv ||
        pps_scaling_win_bottom_offset != refScalingWinBottomOffset |||
        sps_subpic_info_present_flag != fRefSubpicsEnabled (thus meaning,that
ILMVP is disabled if not both the reference picture as well as the picture to be coded are
subdivded or both the reference picture as well as the picture to be coded are not subdivded)
  }
}
```

Alternatively, in one embodiment, it is a requirement of bitstream conformance that a bitstream does not activate TMVP, PROF or MvWrapAround in prediction between a current picture and a reference picture with a different subpicture configuration (enabled vs. disabled) and the bitstream carries an indication of said constraint.

While for TMVP, the implications of the above derivation do, in examples, not affect the decoder, for PROF and MvWrapAround, the decoder may carry out the above modified derivation and behave differently when respective tools are executed/checked.

Alternatively, such a check could be carried out depending on the number or identifier of subpictures in current picture and reference picture, the property of boundary treatment of such subpictures or further characteristics.

4. Encoder 40 and Extractor 10 According to the Fourth Aspect

This section describes embodiments according to the fourth aspect making reference to FIG. 1, wherein details described in section 0 may optionally apply to embodiments according to the fourth aspect. Also, details of the data streams 12, 14 as shown in FIG. 2 and FIG. 5 may be optionally included in embodiments of the third aspects, in which case the corresponding description of sections 1 and 2 applies accordingly. Optimally, also the features described with respect to the first, second and third aspect may be combined with the fourth aspect.

When subpictures are extracted from a multi-layered video data stream, such as video data stream 14, e.g. in examples of the embodiments of the previous sections 1 to 3, a fraction (e.g. indicated by ref_level_fraction_minus1) may either be signaled or be derived that is later used in the determination of certain level limits of the extracted sub-bitstream (e.g. bitrate, (coded picture buffer) CPB size, number of tiles, and so on). E.g., these level constrains may pose, or be related to, decoder capability requirements, which a decoder has to fulfill so as to be capable of decoding the video data stream, or the video sequence described by an OLS, to which the capability requirements refer.

Conventionally, this fraction, when not present, Is Inferred to be equal to the size of the subpicture with respect to the size of the complete picture in its layer as follows:

When not present, the value of ref_level_fraction_minus1 [i][j] is inferred to be equal to Ceil(256*SubpicSizeY [j]÷PicSizeInSamplesY*MaxLumaPs(general_level_idc)÷MaxLumaPs(ref_level_idc[i])−1.

However, a number of issues exist with this mechanism. First, the above inference does not regard the fact that a bitstream can host multiple layers, e.g. regarding the ratio SubpicSizeY[j]÷PicSizeInSamplesY is not sufficient, as some level limits have a bitstream scope (e.g. bitrate and CPB size) whereas other level limits have a layer scope (e.g. number of tiles).

Therefore, it Is part of the present aspect, in one embodiment, the inference is carried out in a fashion that regards all layers in the OLS, i.e. it is derived bitstream specific.

Therefore, as part of the present aspect, in one embodiment, the inference of the fraction per subpicture Is changed to also incorporate the level Impact of reference layers without the subpictures as follows.

When not present, the value of ref_level_fraction_minus1 [i][j] is inferred to be equal to max(255, Ceil (256*SumOfSubpicSizeY[j] ÷SumOfPicSizeInSamplesY*MaxLumaPs (general_level_idc)÷MaxLumaPs(ref_level_idc[i])− 1)). The maximum function could be left off, leading to, Ceil(256*SumOfSubpicSizeY[j] ÷SumOfPicSizeInSamplesY*MaxLumaPs(general_level_idc)÷MaxLumaPs(ref_level_idc[i])−1).

Wherein SumOfSubpicSizeY and SumOfPlcSizeInSamplesY are the sum of all samples associated to the respective subpicture in all layers in the OLS.

FIG. 8 illustrates an example of an extraction of a subpicture specific video data stream 14, for example in accordance with the scenario illustrated in FIGS. 1, 2, 5. FIG. 8 Indicates the relative change of output picture area between the original data stream. e.g. the video 24 of data stream 14 before extraction, and the video sequence 24' of subpicture specific data stream 12 after extraction.

A second issue regards the fact that subpicture can be used in combination with reference layers that do not contain corresponding subpicture as illustrated in FIG. 8 wherein the L0 does not have subpictures.

In order to cover this case, or provide a more accurate level limit, in another embodiment the inference, e.g. of ref_level_fraction_minus1, is carried out as follows:
Wherein SumOfSubpicSizeY and SumOfPicSizeInSamplesY are the sum of all samples associated to the respective subpicture in all layers in the OLS and all layers without subpictures in the OLS.

In another embodiment, the inference of ref_level_fraction_minus1[i][j] is unchanged with respect to state of the art (it remains a layer-specific fraction for layers that contain the subpicture). Instead, alternatively to the above change, an OLS-specific fraction variable is derived from the per-layer specific fraction as in the following:

```
Ols_fraction_nominator[ i ][ j ][ k ] = 0
Ols_fraction_denominator[ i ][ j ][ k ] = 0
Loop over layers in the k-Ols {
    Ols_fraction_nominator[ i ][ j ][ k ]=+ PicSizeInSamplesY[layer] *
(sps_subpic_info_present_flag[layer] ? ref_level_fraction_minus1[ i ][ j ] :
255 )
    Ols_fraction_denominator[ i ][ j ][ k ]=+ PicSizeInSamplesY[layer]
}
OlsRefLevelFraction[ i ][ j ][ k ] = Ols_fraction_nominator[ i ][ j ][ k ]/
Ols_fraction_denominator[ i ][ j ][ k ]
``` wherein k is the index of the OLS, i is the index of the reference level and j is the index of the subpicture.

The above embodiments may expect an equal rate distribution among all layers. In order to allow an encoder to also freely decide about rate distribution among subpicture layers and non-subpicture layers, in another embodiment of the invention, the fraction of the layers without subpictures within the OLS of the bitstream is explicitly signalled. I.e. it is signalled what fraction of the OLS of the bitstream for a given reference level the non-subpicture layers all together correspond to:

| | Descriptor |
|---|---|
| subpic_level_info( payloadSize ) { | |
| num_ref_levels_minus1 | u(3) |
| sli_cbr_constraint_flag | u(1) |
| explicit_fraction_present_flag | u(1) |
| if( explicit_fraction_present_flag ) | |
| sli_num_subpics_minus1 | ue(v) |
| while( !byte_aligned( ) ) | |
| sli_alignment_zero_bit | f(1) |
| for( i = 0; i <= num_ref_levels_minus1; i++ ) { | |
| non_subpic_layers_fraction[ i ] | u(8) |
| ref_level_idc[ i ] | u(8) |
| if( explicit_fraction_present_flag ) | |
| for( j = 0; j <= sli_num_subpics_minus1; j++ ) | |
| ref_level_fraction_minus1[ i ][ j ] | u(8) |
| } | |
| } | | non_subpic_layers_fraction[i] specifies the fraction of the bitstream/OLS-specific level limits associated with layers in bitstream/OLS that have sps_num_subpics_minus1 equal to 0. When vps_max_layers_minus1 is equal to 0, non_subpic_layers_fraction[i] or when no layer in the bitstream/OLS has sps_num_subpics_minus1 equal to 0 non_subpic_layers_fraction[i] shall be equal to 0.

The variable OlsRefLevelFraction[i] [j] of the j-th subpicture for the i-th ref_level_idc is set equal to non_subpic_layers_fraction[i]+(255−non_subpic_layers_fraction[i])÷255*ref_level_fraction_minus1[i][j]+1.

OlsRefLevelFraction[i][j] is to be used OLS specific as discussed in section 5.

According to embodiments of the fourth aspect, the multi-layered video data stream 14 comprises a set of layers, e.g., an OLS such as the OLS selected for decoding. E.g. the OLS may comprise layer L0 and L1 as Illustrated in FIG. 1. It is noted that the multi-layered video data stream encoded by encoder 40 may possibly comprise more than just this set of layers, i.e., this one set of layers, but may comprise further OLSs, and may comprise further layers besides layer L0 and layer L1 shown in FIG. 1. Encoder 40 in accordance with the fourth aspect is configured for encoding, into the multi-layered video data stream 14, a non-reduced version of the set of layers, e.g., layers L0 and L1, wherein video versions, e.g., video sequence $24_0$ and video sequence $24_1$, are encoded into the non-reduced version of the set of layers in units of one or more independently coded subpictures per layer. The wording "in unit of one independently coded subpictures" shall, e.g., denote layers coded unsubdivided into subpictures, i.e., the picture, such as picture $26_0$ of the video version $24_0$, forms one subpicture. For example, one or more such unsubdivided layers may be present in the layer set and one or more subpicture divided layers may be present in the layer set.

Encoder 40 according to the fourth aspect is further configured for encoding, into the multi-layered video data stream 14, a reference decoder capability requirement related to decoding the non-reduced version of the set of layers. Further, encoder 14 according to the fourth aspect is configured for encoding, into the multi-layered video data stream 14, for each layer of the set of layers, information, such as information 22 depicted in FIG. 2, on a picture size of pictures coded into the respective layer of the non-reduced version of the size of layers, and, for each of the one or more independently coded subpictures of the respective layer, a subpicture size. Encoder 40 according to the fourth aspect is configured for determining, for each of one or more reduced versions, for example, the subpicture specific video data stream 12 or further versions of the video data stream 12 which do not necessarily comprise the entire multi-layered video data stream 14, of the set of layers for which the subpicture related portion of at least one layer has been removed, a decoder capability requirement, e.g. OlsRefLevelFraction[i][j], related to decoding the respective reduced version of the set of layers (note that n OlsRefLevelFraction[i][j] is specific to the reduced version related to the j-th subpicture).

Encoder 40 determines the decoder capability requirement for the respective reduced version by scaling the reference decoder capability requirement by a factor determined using a quotient of a sum over subpicture sizes of independently coded subpictures included in the respective reduced version of the set of layers divided by a sum over picture sizes. In other words, the reduced versions of the set of layers refer to versions of the set of layers for which bitstream portions relating to other subpictures, such as subpictures not to be extracted, i.e., which are not part of the predetermined set of sublayers to be forwarded in the subpicture specific video data stream 14, have been removed.

For example, the encoder 40 may provide the decoder capability requirement in the multi-layered video data stream 14, compare, for example, decoder capability requirement 60 as illustrated in FIG. 2.

The decoder capability requirement information may be used as an Indication, whether an extracted bitstream is decodable by a decoder, which is to receive the bitstream. For example, the decoder capability requirement information may be used by a decoder receiving the bitstream for setting up or initializing the decoder.

By determining, for each of the reused versions, a specific decoder capability requirement, the decoder capability requirement may be provided more precisely, so that an information Indicating unnecessarily high decoder capability requirements may be avoided and, for example, the decoder may select the highest quality OLS in accordance with its capabilities.

Accordingly, an embodiment of the extractor 10 according to the fourth aspect, the extractor for extracting from the multi-layered video data stream 14 comprising the set of layers, the subpicture specific video data stream 12, the multi-layered video data stream 14 having a non-reduced version of the set of layers encoded thereinto, and video versions $24_0$, $24_1$ being encoded into the non-reduced version of the set of layers in units of one or more independently coded subpictures per layer, is configured to deriving, from the multi-layered video data stream 14, a reference decoder capability requirement related to decoding the non-reduced version of the set of layers. According to this embodiment, extractor 10 is configured for deriving, from the multi-layered video data stream, for each layer of the set of layers, information, such as information 22 illustrated in FIG. 2, on a picture size of pictures coded into the respective layer of the non-reduced version of the set of layers, and, for each of the one or more independently coded subpictures of the respective layer, a subpicture size. Further, according to this embodiment, the extractor 10 is configured for determining, for a predetermined reduced version, e.g., predetermined by means of an OLS Indication provided by an API, of the set of layers for which a subpicture related portion of at least one layer has been removed, the decoder capability requirement related to decoding the predetermined reduced version of the set of layers by scaling the reference decoder capability requirement by a factor determined using a quotient of a sum over picture sizes of independently coded subpictures included in the predetermined reduced version of the set of layers divided by a sum over picture sizes.

In the following, alternative embodiments of the fourth aspect will be described, still making reference to FIG. 1 and FIG. 2.

According to these alternative embodiments, the multi-layered video data stream 14 comprises a plurality of layers, such as layer L0 and layer L1. Further, encoder 40 is configured for encoding, into the layers of the multi-layered video data stream, video pictures 26, such as the picture $26_0$ and the picture $26_1$, in a manner subdivided into independently coded subpictures with respect to one or more first layers, such as layer L1 in FIG. 1, and in a manner unsubdivided with respect to one or more second layers, such as layer L0. In other words, encoder 14 may encode pictures of the video 24 in a manner subdivided into independently coded subpictures into a layer of a first type, such as the first layer L1, and may encode pictures in a manner unsubdivided into one or more layers of a second type, such as the second layer L0. It is noted that the multi-layered video data stream 14 may comprise one or more layers of the first type and one or more layers of the second type. Encoder 40 according to these alternative embodiments is configured for encoding, into the multi-layered video data stream 14, an indication, such as indication 18 illustrated in FIG. 2, of a layer set of layers such that at least one first layer is included in the layer set and at least one second layer is included in the layer set. For example, the indication of the set of layers may be the OLS indication 18. The multi-layered video data stream 14 may comprise an indication of a plurality of sets of layers, as described with respect to FIG. 1.

Encoder 40 according to these alternative embodiments is configured for encoding, into the multi-layered video data stream 14, information on, for each of several reference decoder capability requirements sufficient for decoding the layer set of layers, a first fraction (e.g. the first fraction 134 of FIG. 9) of the respective reference decoder capability requirement attributed to the at least one first layer, and a section fraction 132 (e.g. the second fraction 134 of FIG. 9) of the respective reference decoder capability requirement attributed to the at least one second layer. E.g. the first fraction 134 may be indicated by the above-introduced syntax element ref_level_fraction_minus1[i][j], and the second fraction 132 may be indicated by the above introduced syntax element non_subpic_layer_fraction[i][j].

For example, the reference decoder capability requirement being sufficient for decoding the layer set of layers may signify, that each of the reference decoder capability requirements is defined, at least, by a minimum CPB size. The several reference decoder capability requirements may possibly be mutually different from each other with respect to their indicated minimum CPB size. It is noted that for some of the reference decoder capability requirements, the layer set may consume only a fraction together, e.g., may consume only a fraction of a totally available CPB size, and thus, a mixer like mixer 100 which will be explained with respect to FIG. 10 may use such information, i.e., the reference decoder capability requirement in order to decide as to how many OLSs of different streams might be mixed together with nevertheless meeting the level/reference decoder capability requirement.

For example, the decoder capability requirement, which may also refer to as decoder capability information (DCI), may indicate requirements for a decoder to decode a layer set to which the decoder capability requirement is associated. For example, the layer set may have associated therewith several reference decoder capability requirements. For example, each of the reference decoder capability requirements associated with a layer set may refer to different versions of the video 24 coded into the layer set, such as different subpicture specific video data streams into which different versions of the video including different subpictures are coded.

Embodiments of the fourth aspect include an apparatus for handling the multi-layered video data stream 14, which apparatus may handle a video data stream provided by the just-described alternative embodiment of the encoder 40. For example, the apparatus for handling the multi-layered video data stream 14 is a mixer, such as mixer 100 described in the following, an extractor, such as extractor 10 of FIGS. 1, 2, 5, a decoder, such as decoder 50, or combinations thereof. The apparatus for handling the data stream is therefore referred to as apparatus 10, 100. For example, decoder 50 and extractor 10 may be combined or one of them may include the other one. The apparatus for handling the multi-layered video data stream according to these embodiments is configured for decoding, from the multi-layered video data stream 14, the Indication of the layer set of layers, which includes at least one first layer and one second layer as described before. The apparatus is configured for decoding, from the multi-layered video data stream 14, the information on, for each of the several reference decoder capability requirements, the first fraction of the respective reference decoder capability requirement attributed to the at least one first layer and the second fraction of the respective reference decoder capability requirement attributed to the at least one second layer.

FIG. 9 illustrates examples of pictures $26_1$ of first layers and pictures $26_0$ of second layers and attributed first fractions 134 and second fractions 132, respectively, as they may be signaled in the video data stream 14 in accordance with the just described alternative embodiments of the fourth aspect. In the example of FIG. 9, the picture $26_1$ of the first layer is subdivided into two subpictures 28. FIG. 9a illustrates a determination of the first fraction $134_1$ and the second fraction $132_1$ for a first reference decoder capability requirement, which may be associated with a first reference level as indicated in FIG. 9. In the illustrative example of FIG. 9, the first reference level is associated with the first CPB 130, (which, in FIG. 9 may represent an illustrative example of a decoder capability requirement) having the exemplarily value of 1000. In FIG. 9, for each of the pictures, or subpictures, respectively, its relative share on a total picture size of a video stream associated with the respective reference decoder capability requirement is indicated. For example, according to FIG. 9a, the picture size of picture $26_0$ has a share of 20% of the total picture size of the video stream. In other words, FIG. 9a illustrates the determination of the reference decoder capability requirement for a video data stream including pictures $26_0$ and $26_1$ having both subpictures included therein. The second fraction $132_1$ is determined as the share of the picture $26_0$ of the second layer with respect to total CPB indicated for the respective decoder capability requirement. The first fraction $134_1$ associated with the decoder capability requirement of the video data stream Illustrated in FIG. 9a is the remaining part of the CPB, i.e., the share which is not used by the picture $26_0$ of the second layer, distributed onto the subpictures of the picture $26_1$ of the first layer.

FIG. 9b illustrates an example for a video data stream similar to the one shown in FIG. 9a, but including only one of the subpictures 28 of the picture $26_1$ of the first layer. Accordingly, the corresponding CPB level is smaller by the size of the fraction of one of the subpictures 28 of FIG. 9a. in the example of FIG. 9b, as the video data stream does only comprise one of the subpictures of the first layer, the share of the picture $26_0$ relative to a total picture area signaled in the video data stream is higher, namely 33% instead of 20%. The second fraction $132_2$ and the first fraction $134_2$ associated with the reference decoder capability requirement for the example of FIG. 9b are determined accordingly, as described with respect to FIG. 9a, taking into account that picture 26, in case of FIG. 9b includes only one of the two subpictures 28.

According to embodiments, encoder 40 may encode the information on the first and second fractions by writing the first fraction into the multi-layered video data stream on the one hand, and the second fraction divided by one minus the first fraction on the other hand. The apparatus 10, 100 may accordingly decode the information the first fraction and the second fraction by reading from the data stream the first fraction, and further the second fraction. Alternatively, the apparatus 10, 100 may decode the information on the first and second fraction by reading the first fraction and a further fraction from the data stream, and deriving the second fraction by multiplying the further fraction by the difference of one minus the first fraction.

According to some examples, encoder 40 may encode information on one or more of the several reference decoder capability requirements, e.g. decoder capability requirements 60 illustrated in FIG. 1, into the multi-layered video data stream. In other words, the encoder 40 may encode information on one or more, but not necessarily all of the several reference decoder capability requirements into the multi-layered video data stream. For example, information on others of the several reference decoder capability requirements may be derivable by default rules. For example, in the example of FIG. 9, based on the information about relative sizes of the subpictures, into which the picture $26_1$ of the first layer is subdivided, information about one of the decoder capability requirement of FIG. 9a and FIG. 9b may be derived from the other one.

For example, encoder 40 may be configured for encoding, for at least one of the several reference decoder capability requirements, the information such that the first fraction 134 and the second fraction 132 relate to a reduced version of the multi-layered video data stream, e.g., the first fraction $134_2$ and the second fraction $132_2$ of FIG. 9b. Encoder may encode the information such that for each of one or more independently coded subpictures present in the reduced version, the first fraction is derivable from the multi-layered video data stream. For example, referring to FIG. 9a, in awareness of the ration between the two subpictures of picture $26_1$, e.g. 50% in FIG. 9a, which may be derivable from parameters in the video encoded into data stream 14 by encoder 40, such as width and or height of the subpictures, e.g. measured in samples or tiles, apparatus 10, 100 may derive the first fraction for the right subpicture of picture $26_1$ from the first fraction for the left subpicture.

Additionally or alternatively, encoder 14 may be configured for encoding, for at least a further one of the several reference decoder capability requirements, the information such that the first fraction and the second fraction relate to a non-reduced version of the multi-layered video data stream, e.g., the first fraction $134_1$ and the second fraction $132_1$ of FIG. 9a, and the first fraction 134 is derived from the multi-layered video data stream 14 for each of the independently coded subpictures of the at least one first layer.

As illustrated in FIG. 9, the apparatus 10, 100 may sum up the first fraction 134 and the second fraction 132 so as to obtain an actual decoder capability requirement, such as a CPB, for the respective layer set. As illustrated, the actual decoder capability requirement may be specific to the subpicture-specific video data stream.

As mentioned, the apparatus 10, 100 may be a mixer, i.e. the apparatus 10, 100 may mix the multi-layered video data stream 14 with a further video data stream. To this end, the apparatus 10, 100 may use the Information on the first and second fraction for forming a further data stream based on data stream 14 and a further input video data stream, e.g. as described with respect to FIG. 10.

5. Encoder 40 and Extractor 10 According to the Fifth Aspect

This section describes embodiments according to the fifth aspect making reference to FIG. 1, wherein details described in section 0 may optionally apply to embodiments according to the fifth aspect. Also, details of the data streams 12, 14 as shown in FIG. 2 and FIG. 5 may optionally be included in embodiments of the third aspect, in which case the corresponding description of sections 1 and 2 applies accordingly. Optionally, also the features described with respect to the first, second, third and in particular the fourth aspect may be combined with the fifth aspect. In particular, examples of the embodiments described in section 5 may be related to embodiments described in section 4, in particular, with respect to the decoder capability requirement and the first and second fractions.

Embodiments of the fifth aspect may be related to a selective application of constraints to layers of an OLS.

As mentioned earlier, the above syntax element ref_level_fraction_minus1[i][j], whether explicitly signalled or Inferred, is used to impose certain layer-specific constraints such as number of tiles in the state-of-the-art. However, for (reference) layers without subpictures, these constraints may be unnecessarily harsh or even may be hard to meet from an encoder perspective, because the extraction process doesn't chance the respective layer but tightens the constraints that the layer has to fulfil.

Therefore, it is part of the present aspect, in another embodiment, to selectively impose the below constraints only for layers in the OLS that contain subpictures, i.e. layers that will undergo a reduction in picture size from the extraction process. The encoder may, thus, take advantage of less restrictions of non-subpicture-subdivided layers.

According to an embodiment of the fifth aspect, the encoder 10 may encode, into one or more first layer, e.g. the first layer L1, pictures $26_1$ in a manner subdivided into independently coded subpictures 28, and into one or more second layer, e.g. layer L0, pictures $26_0$ in a manner unsubdivided, e.g. as illustrated in FIG. 1 or FIG. 2. The encoder may check for a layer set, e.g. an OLS, or for respective layer sets of each of one or more OLSs indicated in an OLS indication 18, layer-specific constraints selectively for the first layers of the layer set, i.e. the layers which have encoded thereinto pictures in a sub-picture subdivided manner, i.e. having encoded thereinto pictures subdivided into at least two subpictures. In other words, the checking may be performed for layers having encoded thereinto pictures in a sub-picture subdivided manner but may be omitted for layers having encoded thereinto pictures in a unsubdivided manner. In other words, the checking may be performed for only for layers having encoded thereinto pictures in a sub-picture subdivided manner.

The constraints which are checked selectively for the first layers relate to a predetermined set of parameters for a subpicture of the respective first layer. In other words, the encoder may check, for each of the subpictures of the respective first layer, the constraints for each of one or more reference decoder capability requirements to which the constraints are specific For example, the one or more reference decoder capability requirements for which the constraints are checked for the respective subpicture may refer to a subpicture sequence which results from extracting the respective subpicture from the respective first layer, or may refer to a contribution of this subpicture sequence to a video sequence or a video data stream which results from extracting the respective subpicture from the respective first layer. As mentioned in section 0, the bitstream described by an OLS may, also after extraction by extractor 10, still be scalable by selection/extraction of one or more temporal sublayers and/or one or more layers of the OLS. Same applies for the case that extractor 10 extracts a sub-picture specific video data stream, so that the one or more reference decoder capability requirements signaled by the encoder may apply for each subpicture in the video data stream to an extent which is defined, for each of the reference decoder capability requirements, by a fraction of the respective reference decoder capability requirements which fraction is specific to the subpicture, e.g. the first fraction described in section 4. In other words, one or more reference decoder capability requirements may be associated with the respective subpicture, each of the reference decoder capability requirements applying for a possible sub-bitstream which is extractable from a sub-picture specific video data stream specific to the respective subpicture, and each of the reference decoder capability requirements posing constraints which are specific to the reference decoder capability requirement.

For example, the parameters on which the constraints are imposed may include one or more or all of a number of samples, e.g. LUMA samples, e.g. MaxLumaPs a picture size, e.g. a picture width and/or a picture height, e.g. in terms of a number of samples a number of tiles in a row and/or a number of tiles in a column, e.g. MaxTileRows and/or MaxTileCols a total number of tiles For example, the encoder 10 may determine the parameters or properties for the individual subpictures using a fraction of the respective reference decoder capability requirement attributed to the respective subpicture, e.g. the first fraction 134 as described in section 4, e.g. RefLevelFraction[i][j] in the below example, wherein i Indicates the respective reference decoder capability requirement and j indicates the respective subpicture.

The following is an example specification with highlighted changes with respect to the current WC draft specification:

It is a requirement of bitstream conformance that each layer in the bitstream resulting from extracting the j-th subpicture for j in the range of 0 to sps_num_subpics_minus1 and sps_num_subpics_minus1 greater than 0, inclusive, and conforming to a profile with general_tier_flag equal to 0 and level equal to ref_level_idc[i] for i in the range of 0 to num_ref_level_minus1, inclusive, shall obey the following constraints for each bitstream conformance test as specified in Annex C of the VVC specification:

Ceil(256*SubpicSizeY[j]÷RefLevelFraction[i][j]) shall be less than or equal to MaxLumaPs, where MaxLumaPs is specified in Table A.1 (of VVC) for level ref_level_idc[i].

The value of Ceil(256*(sps_subpic_width_minus1[j]+1)*CtbSizeY÷RefLevelFraction[i][j]) shall be less than or equal to Sqrt(MaxLumaPs*8).

The value of Ceil(256*(sps_subpic_height_minus1[j]+1)*CtbSizeY÷RefLevelFraction[i][j]) shall be less than or equal to Sqrt(MaxLumaPs*8).

The value of SubpicWidthInTiles[j] shall be less than or equal to MaxTileCols and of SubpicHeightInTiles[j] shall be less than or equal to MaxTileRows, where MaxTileCols and MaxTileRows are specified in Table A.1 (of VVC) for level ref_level_idc[i].

The value of SubpicWidthInTiles[j] *SubpicHeightInTiles[j] shall be less than or equal to MaxTileCols*MaxTileRows*RefLevelFraction[i][j], where MaxTileCols and MaxTileRows are specified in Table A.1 (of VVC) for level ref_level_idc[i].

In another embodiment, RefLevelFraction[i][j] is derived to be equal to 255 (e.g. having a fraction of 100%) for layers of the OLS with sps_num_subpics_minus1 equal to 0.

In another embodiment, the limits related MaxLumaPs, the maximum and minimum aspect ratio, or the number of tiles columns or rows, slices or subpictures are layer specific and use a layer-specific ref_level_fraction (i.e. 255 for layers without subpictures) whereas layer-specific limits related to CPB size, Bitrate and MinCR as below are to be enforced based on an OLS-specific OLSRefLevelFraction equal to OLS_fraction[k] (e.g as derived above in Section 4).

The variables SubpicCpbSizeVcl[i][j] and SubpicCpbSizeNal[i][j] are derived as follows:

SubpicCpbSizeVcl[$i$][$j$]=Floor
(CpbVclFactor*MaxCPB*OLSRefLevelFraction
[$i$][$j$]÷256)  (D.5)

SubpicCpbSizeNal[$i$][$j$]=Floor
(CpbNalFactor*MaxCPB*OLSRefLevelFraction
[$i$][$j$]÷256)  (D.6)

with MaxCPB derived from ref_level_idc[i] as specified in clause A.4.2.

The variables SubpicBitRateVcl[i][j] and SubpicBitRateNal[i][j] are derived as follows:

SubpicBitRateVcl[$i$][$j$]=Floor
(CpbVclFactor*ValBR*OLSRefLevelFraction[$i$]
[$j$]÷256)  (D.7)

SubpicBitRateNal[$i$][$j$]=Floor
(CpbNalFactor*ValBR*OLSRefLevelFraction[$i$]
[$j$]÷256)  (D.8)

NOTE 1—When a subpicture is extracted, the resulting bitstream has a CpbSize (either indicated in the SPS or inferred) that is greater than or equal to SubpicCpbSizeVcl[i][j] and SubpicCpbSizeNal[i][j] and a BitRate (either indicated in the SPS or inferred) that is greater than or equal to SubpicBitRateVcl[i][j] and SubpicBitRateNal[i][j].

The sum of the NumBytesInNalUnit variables for AU 0 corresponding to the j-th subpicture shall be less than or equal to FormatCapabilityFactor*(Max(SubpicSizeY[j], fR*MaxLumaSr*OLSRefLevelFraction[i][j]÷256)+MaxLumaSr*(AuCpbRemovalTime[0]−AuNominalRemovalTime[0])*OLSRefLevelFraction[i][j])÷(256*MinCr) for the value of SubpicSizeInSamplesY of AU 0, where MaxLumaSr and FormatCapabilityFactor are the values specified in Table A.2 and Table A.3, respectively, that apply to AU 0, at level ref_level_idc[i], and MinCr is derived as indicated in A.4.2 (of the VVC draft).

The sum of the NumBytesInNalUnit variables for AU n (with n greater than 0) corresponding to the j-th subpicture shall be less than or equal to FormatCapabilityFactor*MaxLumaSr*(AuCpbRemovalTime[n]−AuCpbRemovalTime[n−1])*OLSRefLevelFraction[i][j]÷(256*MinCr), where MaxLumaSr and FormatCapabilityFactor are the values specified in Table A.2 and Table A.3 respectively, that apply to AU n, at level ref_level_idc[i], and MinCr is derived as indicated in A.4.2 (of the VVC draft).

Embodiments of the encoder 40, the extractor 10, and the multi-layered video data stream 14 in accordance with the fifth aspect are described in the following.

According to the fifth aspect, the multi-layered video data stream comprises a plurality of layers. The multi-layered video data stream 14 has encoded into layers of the multi-layered video data stream, for example, by means of encoder 40, video pictures 26 in a manner subdivided into independently coded subpictures with respect to one or more first layers, e.g., layer L1, and in a manner unsubdivided with respect to one or more second layers, e.g., layer L1. Further, the multi-layered video data stream 14 comprises an indication of a layer set of layers, such as the OLS as described in the previous sections, wherein, according to the fifth aspect, the layer set includes at least one first layer, i.e., a layer into which pictures are encoded in a manner subdivided into independently coded subpictures. According to the fifth aspect, the multi-layered video data stream has encoded thereinto, reference decoder capability requirement information, e.g., as described in section 4, the reference decoder capability requirement information being related to decoding a non-reduced version of the layer set and including a first decoder capability requirement parameter for each layer of the layer set and a second decoder capability requirement parameter for the layer set. As described in section 4, the non-reduced version may refer to a version of the video data stream encoded into the layer set including all video data encoded into the layer set, i.e., all subpictures of the at least one first layer of the layer set. For example, the first decoder capability requirement parameter may be a number of tiles into which the layer's pictures are subdivided. For example, tiles are mutually independently coded sections of a picture. For example, the second decoder capability requirement parameter may refer to a required or needed picture buffer size, such as ACPB and/or a decoded picture buffer (DPB) size and/or a minimum compression ratio (minCR).

According to the fifth aspect, encoder 40 is configured for determining, for each of one or more reduced versions of the layer set for which a subpicture related portion of at least one first layer has been removed, further reference decoder capability requirement information related to decoding the respective non-reduced version, or reduced version of the layer set. A reduced version of the layer set may refer to a video data stream which does not comprise all video data of the layer set, e.g., the subpicture related video data stream 12, i.e., a video data stream from which a subpicture related portion, i.e., a portion which is not related to the predetermined set of subpictures as described with respect to FIG. 1, 2, 5, is omitted when extracting the respective reduced version of the layer set. Encoder 40 is configured for determining the further reference decoder capability requirement information by scaling the first decoder capability requirement parameter using a first fraction to obtain a third decoder capability requirement parameter for each layer of the layer set. For example, the first fraction may be determined based on a ratio of picture sizes between pictures of each layer within layer sets and within the reduced version of that layer set. Encoder 40 may optionally encode the first fraction into the multi-layered video data stream 14. Accordingly, extractor 10 may optionally derive the first fraction from the multi-layered video data stream 14, or may alternatively determine the first fraction as performed by encoder 40.

Encoder 40 is further configured for determining the further reference decoder capability requirement information by scaling the second decoder capability requirement parameter using a second fraction to obtain a fourth decoder capability requirement parameter for the respective reduced version of the layer set. The second fraction may, for example, be different from the first one.

The second fraction may be determined based on a ratio coding to a section 4, such as the fraction 134 of the fraction 132. Encoder 40 may optionally encode the second fraction into the multi-layered video data stream 14. Accordingly, extractor 10 may optionally derive the second fraction from the multi-layered video data stream 14 or determine the second fraction similar as performed by encoder 40.

Encoder 10 forms the subpicture specific video data stream 12 based on the multi-layered video data stream 14 by removing the subpicture related portion of at least one first layer of the multi-layered video data stream 14 and providing the subpicture specific video data stream 12 with a third and fourth decoder capability requirement parameter. Alternatively, encoder 10 may form the subpicture specific video data stream 12 based on the multi-layered video data stream by removing the subpicture related portion of at least one first layer and providing the subpicture specific video data stream 12 with the first and second fraction for a determination of the further reference decoder capability requirement information related to decoding the predetermined non-reduced version of the layer set of layer by a decoder.

6. Encoder 40 and Decoder 110 According to FIG. 10

FIG. 10 illustrates a first encoder $40_1$ and a second encoder $40_2$, each of which may optionally correspond to the encoder 40 as described with respect to FIG. 1 and sections 1-5. Encoder $40_1$ is configured for encoding a video data stream $12_1$, and encoder $40_2$ is configured for encoding a video data stream $12_2$. Video data streams $12_1$, $12_2$ may optionally, but do not necessarily comprise a plurality of layers. In other words, video data streams $12_1$, $12_2$ according to FIG. 10 may optionally be multi-layered video data stream, such as video data stream 14, but in examples may include only one single layer. Apart from that, video data streams $12_1$, $12_2$ according to FIG. 10 may optionally correspond to video data stream 14 as described in the previous sections.

Encoder 40, is configured for encoding pictures $26_1$ into video data stream $12_1$. Encoder $40_2$ is configured for encoding pictures $26_2$ into video data stream $12_2$. Pictures $26_1$ and pictures $26_2$ may optionally be encoded into the respective video streams $12_1$, $12_2$ by way of one or more independently coded subpictures 28. Encoders $40_1$, $40_2$ are configured for encoding, into the respective video data stream $12_1$, $12_2$ an indication 80 indicating whether pictures $26_1$, $26_2$ are encoded into the respective video data stream by way of one or may independently coded subpictures. The indication 80 discriminates between difference types of coding independency between the one or more independently coded subpictures 28 and a surrounding of the one or more independently coded subpictures. For example, the surrounding of the one or more independently coded subpictures may refer to a picture area around the respective subpictures.

For example, indication 80 may be an m-array syntax element with m>1 or may include more than 1 syntax element so as to be Indicative of whether any such independently coded subpictures exist, and if yes, a further syntax element revealing the type of decoding independency.

FIG. 10 further illustrates an apparatus 100 for providing a video data stream 20 on the basis of one or more input video data streams 12, such as video data stream $12_1$ and video data stream $12_2$. For example, the apparatus 100 may mix the video data streams $12_1$, $12_2$, so as to determine the video data stream 20. Thus, the apparatus 100 may be referred to as a mixer 100. Optionally, apparatus 100 may further be configured for extracting the video data stream 20 from one or more input video data streams, such as video data stream 12, and/or video data stream $12_2$. For example, mixer 100 may extract from each of one or more of its input video data streams, a portion or all of the video data and providing the video data in the video data stream 20, wherein video data extracted from different ones of its input video data streams. For example, as illustrated in FIG. 10, apparatus 100 may extract, from each of the video data streams $12_1$, $12_2$, one or more of the subpictures and combine then with one or more of subpictures associated with the same presentation time so as to obtain the video data stream 20.

FIG. 10 further illustrates a decoder 110, which may optionally correspond to decoder 50 as described with respect to the previous sections. Decoder 110 is configured for decoding from the video data stream 20, in the indication 80.

In examples, encoder $40_1$, $40_2$, and decoder 110 may, independent from which of the different types of coding independency which the indication 80 indicates, perform, responsive to (e.g. only if, or perform not if not . . . ) the indication 80 indicating that the pictures encoded into the video data stream are encoded by way of one or more independently coded subpictures, one or more of the following actions:

reading a subpicture identifier from each bitstream packet of the video data stream, which indicates as to which of the one or more independently coded subpictures is encoded into the respective bitstream packet, and/or preventing an in-loop filtering from crossing subpicture boundaries, and/or deriving a picture position from a block address of a block of the picture, which block address is coded into a predetermined bitstream portion of the video data stream, dependent on which of the one or more independently coded subpictures is encoded into the predetermined bitstream packet (and, e.g., otherwise derive such picture position from the block address by referring to a predetermined picture position such as the upper left corner thereof inevitably), and/or allowing for different NAL unit types occurring in one access unit of he video data stream. E.g. the mixer 100 of FIG. 10 is allowed to mix bitstreams $12_{1,2}$ in a manner so that in the mixed data stream 90 one subpicture 28 has one NAL unit type and another subpicture 28 within the same picture is coded using another NAL unit type; the NAL unit types are coded into the bitstream packets 16 and remain there unamended when they become packets 16' of stream 90; the decoder 110 does see no conflict as the pictures are completely coded using coding independency whatever type used for the subpictures 28 in the decoded (mixed) pictures 26' and/or on encoder side, deriving, for each of the one or more independently coded subpictures, decoder capability requirement information.

For example, the different types of coding independency between the subpictures of the picture comprise an encoder-constrained encoding type, wherein the decoder is configured to, if the encoder-constrained encoding type is indicated by the indication with respect to the independently coded subpictures, perform no independency handling at boundaries of the independently coded subpictures, and an decoder-aware encoding type, wherein the decoder is configured to, if the decoder-aware encoding type is indicated by the indication with respect to the independently coded subpictures, perform independency handling at boundaries of the independently coded subpictures by vector clipping for vector-based prediction and/or boundary padding at the boundaries of the independently coded subpictures.

In other words, embodiments according to the sixth aspect may allow for a mixing of subpictures or MCTS.

The current WC draft specification includes numerous measures for enabling partitioning into subpictures to enable extraction and merging functionality, e.g.

carriage of a subpicture identifier in slice headers, or
a block addressing scheme dependent on the subpictures identifiers, or
conformance information for individual subpictures, or
mixing of NAL unit types in a picture (e.g. IRAP and TRAIL).

However, all these measures are dependent on a boundary treatment property of the subpicture, i.e. that sample values are extrapolated for sample and syntax prediction outside the boundaries of the subpictures in the same fashion as they are for boundaries of the picture, i.e. special boundary padding treatment of decoder side. This allows independent coding of subpictures and subsequently extraction and merging. This property is also used to enable all the above measures for extraction and merging functionality. The FIG. 11 illustrates a bitstream that only uses such decoder-side treated subpictures in the first two access units of the bitstream. In other words, FIG. 6 illustrates an Example of a bitstream that mixes decoder-side boundary treatment and encoder-side boundary treatment in its independently coded subpictures.

However, there exists further methods for independent coding of such rectangular regions, i.e. motion constraints obeyed during encoding or in other words: encoder-side boundary treatment. An encoder can simply avoid references that would lead to reconstruction errors after extraction or merging by not pointing outside of the circumference of each subpicture. Based on the state-of-the-art signalling, an encoder would have to indicate that from the second IRAP in FIG. 11 onwards, the right subpicture of L1 is not independently coded as no decoder-side boundary treatment occurs and hence, some of the above measures for extraction and merging functionality can be efficiently used. Most importantly, conformance information is tied to decoder-side boundary treatment. However, a mere indication of other means for independent coding should enable an encoder and allow a network device or decoder to facilitate said means.

It is important to notice, that such a bitstream mixing different kinds on independent coding between neighbouring subpictures must not necessarily contain more than a single layer as illustrated in FIG. 12. FIG. 12 illustrates an example of a single layer mixing of types of subpicture independence.

It is therefore part of the present aspect, to allow a decoder to recognize that all previously mentioned measures for independent region coding (addressing scheme, conformance info) can be used despite the absence of boundary padding by indicating in the bitstream that regions are coded independently through means of a constrained encoding of certain subpictures. In one embodiment of the present aspect, the flag used for indication of the decoder-side padding procedure (sps_subpic_treated_as_pic_flag[i] equal to 1) is changed to sps_subpic_treated_as_pic_mode[i] wherein a new state (equal to 2) indicates that the i-th subpicture is coded independently be means of encoder-side boundary treatment constraints.

An example is shown in the following:

```
if( !sps_independent_subpics_flag) {
    sps_subpic_treated_as_pic_mode[ i ]              u(±2)
    sps_loop_filter_across_subpic_enabled_flag[ i ]  u(1)
``` sps_subpic_treated_as_pic_mode[i] equal to 2 specifies that the i-th subpicture of each coded picture in the CLVS is treated as a picture in the decoding process excluding in-loop filtering operations. sps_subpic_treated_as_pic_mode[i] equal to 0 or 1 specifies that the i-th subpicture of each coded picture in the CLVS is not treated as a picture in the decoding process excluding in-loop filtering operations. When not present, the value of sps_subpic_treated_as_pic_mode[i] is inferred to be equal to 2. The value 3 of sps_subpic_treated_as_pic_mode[i] is reserved for future use by ITU-T|ISO/IEC.

And the constraint that NAL unit of different types cannot be mixed unless the subpictures are encoder-side constraint or decoder-side boundary treatment is carried out.

When any two subpictures in a picture have different NAL unit types, the value of sps_subpic_treated_as_pic_mode[ ] shall not be equal to 0 for all subpictures in the picture that contain at least one P or B slice.

FIG. 13 illustrates an example of allowed and forbidden mixing of NAL units depending on subpicture being Independent either encoder-side constraints or decoder-side boundary treatment.

7. Further Embodiments

In the previous sections 0 to 6, although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described embodiments are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

The invention claimed is:

1. An encoder for encoding a video into a multi-layered video data stream, the encoder comprising:
   a processor; and
   a memory storing instructions that, when executed by the processor, cause the processor to:
   encode, into a first layer (L1) of the multi-layered video data stream, a first version of the video using one or more inter-layer prediction tools, from a set of inter-layer prediction tools, for prediction from a second layer (L0) of the multi-layered video data stream and using a first configuration setting for subpicture-wise independent coding, and
   encode, into the second layer (L0) of the multi-layered video data stream, a second version of the video using a second configuration setting for the subpicture-wise independent coding,
   check whether the first and second configuration settings have a predetermined relationship indicating that the first and second versions of the video include an equal number of subpictures,
   upon a determination that the first and second configuration settings do not have the predetermined relationship, deactivate, or refrain from making use of, at least one of the set of inter-layer prediction tools.

2. The encoder of claim 1, wherein to check whether the first and second configuration settings have the predetermined relationship, the instructions, when executed by the processor, cause the processor to identify the predetermined relationship when the first and second configuration settings indicate at least one of:
   the first and second versions of the video are encoded into the first and second layers in a manner subdivided into a number of subpictures, respectively, equal among the first and second versions of the video,
   the first and second versions of the video are encoded into the first and second layers in a manner subdivided into a number of subpictures, respectively, equal among the first and second versions of the video, wherein boundaries of the subpictures spatially coincide,
   the first and second versions of the video are encoded into the first and second layers in a manner subdivided into a number of subpictures, respectively, which coincide in subpicture IDs signaled for the subpictures in the multi-layered video data stream, or
   the first and second versions of the video are encoded into the first and second layers in a manner subdivided into a number of subpictures, respectively, which coincide in boundary treatment for the subpictures.

3. The encoder of claim 1, wherein the at least one inter-layer prediction tool comprises at least one of:
   inter-layer motion vector prediction,
   optical flow refinement of vector-based inter-layer prediction, or
   motion vector wrap around in vector-based inter-layer prediction.

4. The encoder of claim 1, wherein the instructions, when executed by the processor, further cause the processor to:
signal the first and second configuration settings in the multi-layered video data stream.

5. The encoder of claim 1, wherein the instructions, when executed by the processor, further cause the processor to:
upon a determination that the first and second configuration settings have the predetermined relationship, activate, or making use of, any of the inter-layer prediction tools, from the set of inter-layer prediction tools, to encode the first version of the video.

6. The encoder of claim 1, wherein the instructions, when executed by the processor, further cause the processor to:
generate a flag indicating whether the first and second versions of the video include different numbers of subpictures;
include the flag in the multi-layered video data stream; and
check whether the first and second configuration settings have a predetermined relationship based on the flag.

7. A decoder for decoding a multi-layered video data stream, comprising:
a processor; and
a memory storing instructions that, when executed by the processor, cause the processor to:
obtain the multi-layered video data stream that includes a first layer (L1) and a second layer (L0),
decode, from the first layer (L1) of the multi-layered video data stream, a first version of a video using one or more inter-layer prediction tools, from a set of inter-layer prediction tools, for prediction from the second layer (L0) of the multi-layered video data stream and using a first configuration setting for subpicture-wise independent coding,
decode, from the second layer (L0) of the multi-layered video data stream, a second version of the video using a second configuration setting for subpicture-wise independent coding,
check whether the first and second configuration settings have a predetermined relationship indicating that the first and second versions of the video include different numbers of subpictures, and
upon a determination that the first and second configuration settings have the predetermined relationship, deactivate at least one of the set of inter-layer prediction tools.

8. The decoder of claim 7, wherein subpicture-wise independent decoding includes at least one of:
vector clipping at subpicture boundaries, or
boundary padding at subpicture boundaries.

9. The decoder of claim 7, wherein to check whether the first and second configuration settings have the predetermined relationship, the instructions, when executed by the processor, cause the processor, to determine that there is no predetermined relationship when the first and second configuration settings indicate at least one of:
the first and second versions of the video are encoded into the first and second layers in a manner subdivided into a number of subpictures, respectively, equal among the first and second versions of the video,
the first and second versions of the video are encoded into the first and second layers in a manner subdivided into a number of subpictures, respectively, which coincide in subpicture IDs signaled for the subpictures in the multi-layered video data stream, or
the first and second versions of the video are encoded into the first and second layers in a manner subdivided into a number of subpictures, respectively, which coincide in boundary treatment for the subpictures.

10. The decoder of claim 7, wherein the at least one inter-layer prediction tool comprises at least one of:
inter-layer motion vector prediction,
optical flow refinement of vector-based inter-layer prediction, or
motion vector wrap around in vector-based inter-layer prediction.

11. The decoder of claim 7, wherein the instructions, when executed by the processor, further cause the processor to:
identify from the multi-layered video data stream a flag; and
check whether the first and second configuration settings have the predetermined relationship based on a value of the flag,
wherein when the flag indicates a first value, the first and second versions of the video include different numbers of subpictures, and
wherein when indicates flag is a second value, the first and second versions of the video include an equal number of subpictures.

12. The decoder of claim 7, wherein the first and second versions of the video include matching spatial resolution and scaling window offsets.

13. A method for encoding a video into a multi-layered video data stream, the method comprising:
encoding into a first layer (L1) of the multi-layered video data stream a first version of the video using one or more inter-layer prediction tools, from a set of inter-layer prediction tools, for prediction from a second layer (L0) of the multi-layered video data stream and using a first configuration setting for subpicture-wise independent coding, and
encoding into the second layer (L0) of the multi-layered video data stream a second version of the video using a second configuration setting for the subpicture-wise independent coding,
checking whether the first and second configuration settings have a predetermined relationship indicating that the first and second versions of the video include an equal number of subpictures,
upon a determination that the first and second configuration settings do not have the predetermined relationship, deactivating, or refraining from making use of, at least one of the set of inter-layer prediction tools.

14. The method of claim 13, wherein checking whether the first and second configuration settings have the predetermined relationship, comprises identifying the predetermined relationship when the first and second configuration settings indicate at least one of:
the first and second versions of the video are encoded into the first and second layers in a manner subdivided into a number of subpictures, respectively, equal among the first and second versions of the video,
the first and second versions of the video are encoded into the first and second layers in a manner subdivided into a number of subpictures, respectively, equal among the first and second versions of the video, wherein boundaries of the subpictures spatially coincide,
the first and second versions of the video are encoded into the first and second layers in a manner subdivided into a number of subpictures, respectively, which coincide in subpicture IDs signaled for the subpictures in the multi-layered video data stream, or the first and second versions of the video are encoded into the first and second layers in a manner subdivided into a number of subpictures, respectively, which coincide in boundary treatment for the subpictures.

15. The method of claim 13, wherein the at least one inter-layer prediction tool comprises at least one of:
   inter-layer motion vector prediction,
   optical flow refinement of vector-based inter-layer prediction, or
   motion vector wrap around in vector-based inter-layer prediction.

16. The method of claim 13, further comprises: signaling the first and second configuration settings in the multi-layered video data stream.

17. The method of claim 13, further comprises upon a determination that the first and second configuration settings have the predetermined relationship, activating, or using any of the inter-layer prediction tools, from the set of inter-layer prediction tools, to encode the first version of the video.

18. The method of claim 13, further comprises:
   generating a flag indicating whether the first and second versions of the video include different numbers of subpictures;
   including the flag in the multi-layered video data stream; and
   checking whether the first and second configuration settings have a predetermined relationship based on the flag.

19. A non-transitory computer readable medium comprising a program that when executed by a processor causes the processor to perform the method of claim 13.

20. A method for decoding a multi-layered video data stream, comprising:
   obtaining the multi-layered video data stream that includes a first layer (L1) and a second layer (L0),
   decoding, from the first layer (L1) of the multi-layered video data stream, a first version of a video using one or more inter-layer prediction tools, from a set of inter-layer prediction tools, for prediction from the second layer (L0) of the multi-layered video data stream and using a first configuration setting for sub-picture-wise independent coding;
   decoding, from the second layer (L0) of the multi-layered video data stream, a second version of the video using a second configuration setting for subpicture-wise independent coding;
   checking whether the first and second configuration settings have a predetermined relationship indicating that the first and second versions of the video include different numbers of subpictures; and
   upon a determination that the first and second configuration settings have the predetermined relationship, deactivating at least one of the set of inter-layer prediction tools.

21. The method of claim 20, wherein subpicture-wise independent decoding includes at least one of:
   vector clipping at subpicture boundaries, or
   boundary padding at subpicture boundaries.

22. The method of claim 20, wherein checking whether the first and second configuration settings have the predetermined relationship, comprises determining that there is no predetermined relationship when the first and second configuration settings indicate at least one of:
   the first and second versions of the video are encoded into the first and second layers in a manner subdivided into a number of subpictures, respectively, equal among the first and second versions of the video,
   the first and second versions of the video are encoded into the first and second layers in a manner subdivided into a number of subpictures, respectively, which coincide in subpicture IDs signaled for the subpictures in the multi-layered video data stream, or
   the first and second versions of the video are encoded into the first and second layers in a manner subdivided into a number of subpictures, respectively, which coincide in boundary treatment for the subpictures.

23. The method of claim 20, wherein the at least one inter-layer prediction tool comprises at least one of:
   inter-layer motion vector prediction,
   optical flow refinement of vector-based inter-layer prediction, or
   motion vector wrap around in vector-based inter-layer prediction.

24. The method of claim 20, further comprising:
   identifying from the multi-layered video data stream a flag; and
   checking whether the first and second configuration settings have the predetermined relationship based on a value of the flag,
   wherein when the flag indicates a first value, the first and second versions of the video include different numbers of subpictures, and
   wherein when indicates flag is a second value, the first and second versions of the video include an equal number of subpictures.

25. The method of claim 20, wherein the first and second versions of the video include matching spatial resolution and scaling window offsets.

26. A non-transitory computer readable medium comprising a program that when executed by a processor causes the processor to perform the method of claim 20.

* * * * *